United States Patent
Ogasawara et al.

(10) Patent No.: US 7,721,052 B2
(45) Date of Patent: May 18, 2010

(54) SYSTEM AND METHOD OF REDUCING POWER CONSUMPTION OF A MAIN MEMORY

(75) Inventors: Katsuhisa Ogasawara, Kawasaki (JP); Yumiko Sugita, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 449 days.

(21) Appl. No.: 11/783,897

(22) Filed: Apr. 12, 2007

(65) Prior Publication Data
US 2008/0082779 A1 Apr. 3, 2008

(30) Foreign Application Priority Data
Sep. 29, 2006 (JP) ............................. 2006-267843

(51) Int. Cl.
*G06F 12/06* (2006.01)
(52) U.S. Cl. ...................................... 711/152; 711/163
(58) Field of Classification Search ........................ None
See application file for complete search history.

(56) References Cited

U.S. PATENT DOCUMENTS

| 6,215,714 | B1 | 4/2001 | Takemae et al. | |
|---|---|---|---|---|
| 6,954,837 | B2 | 10/2005 | Woo et al. | |
| 6,961,821 | B2 * | 11/2005 | Robinson | 711/133 |
| 2005/0183041 | A1 | 8/2005 | Chiu et al. | |
| 2007/0006000 | A1 * | 1/2007 | Jain et al. | 713/300 |
| 2008/0126690 | A1 * | 5/2008 | Rajan et al. | 711/105 |

FOREIGN PATENT DOCUMENTS

| JP | 2004-126968 A | 4/2004 |
|---|---|---|
| JP | 2005-235204 A | 9/2005 |

* cited by examiner

*Primary Examiner*—Than Nguyen
(74) *Attorney, Agent, or Firm*—McDermott Will & Emery LLP

(57) ABSTRACT

A computing node which reduces substantially and effectively reduces the power consumed by a memory is provided without affecting the efficiency whereby a processor accesses the memory. The computing node executes a user program sent by a control node. In case of which a message including the capacity of the memory required to execute a user program is received, a memory rank corresponding to the capacity of the required memory is made active by a memory controller before the user program is loaded into the memory.

19 Claims, 18 Drawing Sheets

| ADDRESSING/MODE ~2113 | ADDRESSING METHOD |
|---|---|
| NORMAL MODE | ALLOCATE MEMORY ADDRESSES TO CHANNEL 0, THEN TO CHANNEL 1,.....n. |
| FULL INTERLEAVE MODE | ALLOCATE MEMORY ADDRESSES ALTERNATELY TO CHANNEL 0,....n FOR EACH INTERLEAVE SIZE FOR ALL CHANNELS |
| m CHANNEL INTERLEAVE MODE | ALLOCATE MEMORY ADDRESSES ALTERNATELY TO CHANNEL 0,....m-1 FOR EACH INTERLEAVE SIZE WITH m CHANNEL UNIT |
| FULL INTERLEAVE/POWER CONTROL MODE | ALLOCATE MEMORY ADDRESSES ALTERNATELY TO CHANNEL 0,....n FOR EACH RANK SIZE FOR ALL CHANNELS |
| m CHANNEL/INTERLEAVE/POWER CONTROL MODE | ALLOCATE MEMORY ADDRESSES ALTERNATELY TO CHANNEL 0,....m-1 FOR EACH RANK SIZE WITH m CHANNEL UNIT. LIKEWISE ALLOCATE MEMORY ADDRESSES UP TO CHANNEL n. |

FIG. 3

| POWER MODE | POWER CONSUMPTION | MODE CHANGE-OVER LATENCY |
|---|---|---|
| $PS_0$ POWER MODE 0 (STANDBY) | $X_0$ | POWER MODE 0 : 0<br>POWER MODE 1 : $Y_{0,1}$<br>POWER MODE 2 : $Y_{0,2}$ |
| $PS_1$ POWER MODE 1 (POWER-DOWN) | $X_1$ | POWER MODE 0 : $Y_{1,0}$<br>POWER MODE 1 : 0<br>POWER MODE 2 : NOT VALID |
| $PS_2$ POWER MODE 2 (SELF-REFRESH) | $X_2$ | POWER MODE 0 : $Y_{2,0}$<br>POWER MODE 1 : NOT VALID<br>POWER MODE 2 : 0 |

*FIG. 5*

| MEMORY ZONE | ADDRESS RANGE | POWER RANK ZONE | POWER RANK ZONE SIZE | POWER STATE | NUMBER OF UNUSED MEMORY PAGE FRAMES |
|---|---|---|---|---|---|
| Zone0 | 6061 ⟶ 0~$X_0$ | $PR_0$ | $RS_0$ | $PS_0$ | $Su_0$ |
| | | ... | ... | ... | ... |
| | 6062 ⟶ | $PR_{x0}$ | $RS_{x0-0}$ | $PS_{x0}$ | $Su_{x0}$ |
| Zone1 | 6071 ⟶ $X_0$~$X_1$ | $PR_{x0}$ | $RS_{x0-1}$ | $PS_{x0}$ | $Su_{x0}$ |
| | | ... | ... | ... | ... |
| | 6072 ⟶ | $PR_{x1}$ | $RS_{x1-0}$ | $PS_{x1}$ | $Su_{x1}$ |
| Zone2 | 6081 ⟶ $X_1$~$X_2$ | $PR_{x1}$ | $RS_{x1-1}$ | $PS_{x1}$ | $Su_{x1}$ |
| | | ... | ... | ... | ... |
| | 6082 ⟶ | $PR_n$ | $RS_n$ | $PS_n$ | $Su_n$ |

*FIG. 6*

| COMPUTING COMPUTER NODE | NODE STATE | NODE IDENTIFIER | INSTALLED MEMORY | ... |
|---|---|---|---|---|
| Node $p$ | RUNNING | ID0 | R0 | ... |
| Node $q$ | RUNNING | ID1 | R1 | ... |
| ... | | | | ... |
| Node $r$ | RUNNING | ID$n$ | R$n$ | ... |

| PROGRAM/LIBRARY NAME | CODE AREA | STATIC DATA AREA | DYNAMIC DATA AREA | TEMPORARY DATA AREA | SUM TOTAL | ADJUSTMENT VALUE | FULL ACTIVATION FLAG | ACTIVATION CONFIRMATION FLAG | UPDATED FLAG |
|---|---|---|---|---|---|---|---|---|---|
| Prog | $C_p$ | $Ds_p$ | $Dd_p$ | $Dt_p$ | $C_p + Ds_p + Dd_p + Dt_p$ | A | OFF | OFF | ON |
| Lib 0 | $C_{l0}$ | $Ds_{l0}$ | $Dd_{l0}$ | $Dt_{l0}$ | $C_{l0} + Ds_{l0} + Dd_{l0} + Dt_{l0}$ | | | | |
| ... | | | | | | | | | |
| Lib n | $C_{ln}$ | $Ds_{ln}$ | $Dd_{ln}$ | $Dt_{ln}$ | $C_{ln} + Ds_{ln} + Dd_{ln} + Dt_{ln}$ | | | | |

| PROGRAM NAME | PRIORITY ALLOCATION POWER RANK ZONE NUMBER | USAGE POWER RANK ZONE PRIORITY ORDER | MEMORY ALLOCATION POLICY | POWER RANK ZONE SPECIFICATION FLAG |
|---|---|---|---|---|
| Prog0 | 5 | PRx p, PRx p+1, PRx p+2, PRx p+3, PRx p+4 | ASCENDING ORDER FROM PRx p+5 | ON |
| ... | | | | |
| Prog l | 7 | PRx q, PRx q+1, PRx q+2, PRx q+3, PRx q+4, PRx q+5, PRx q+6 | - | |
| ... | | | | |
| Prog m | 5 | - | - | |
| ... | | | | |
| Prog n | 4 | PRx r, PRx r-1, PRx r-2, PRx r-3 | DESCENDING ORDER FROM PRx q-4 | |

*FIG. 16*

SYSTEM AND METHOD OF REDUCING POWER CONSUMPTION OF A MAIN MEMORY

CLAIM OF PRIORITY

The present application claims priority from Japanese patent application P2006-267843 filed on Sep. 29, 2006, the content of which is hereby incorporated by reference into this application.

BACKGROUND OF THE INVENTION

This invention relates to a method of memory control and process control of a computing system, and particularly to a method of reducing the power consumption of a main memory taking account of program execution and process control.

In an ordinary computing system, power is consumed by the operation of the hardware with which the computing system is provided. Hardware means the processor, main memory (memory), secondary storage and Input/Output (I/O) devices, for example.

In case of which a computing system consumes power in large amount, a large amount of heat is generated simultaneously. For this reason, a cooling installation for removing the heat generated by the computing system must be installed. Apart from the cost of the power consumed by the computing system, the cooling installation also incurs costs.

A system design is therefore required which takes account of the power consumed by the computing system and the performance of the computing system. From the viewpoint of saving battery power, it is also important to reduce the power consumed by the operation of the hardware in modular devices.

The main memory with which a computing system is provided is one of the hardware devices which generally consume power in large amounts. For example, computing systems such as large scale computing systems and super parallel computing systems have very high capacity main memories. Hence, of all the power consumed by the hardware in the computing system, the proportion consumed by the main memory device is large.

Today, main memories in computer servers, personal computers and modular devices have increasingly high capacities.

However, while control is commonly executed to reduce the power consumed by the processor and peripheral devices, control is not usually executed to reduce the power consumed by the main memory. Henceforth, it will thus be necessary to also reduce the power consumed by the main memory.

In general, the main memory stores commands and data for the processor to execute processing. Specifically, the processor loads an operating system (hereafter, OS) and application software stored by a secondary storage, into the main memory. The processor then extracts commands included in the OS and application software which were loaded into the main memory, and executes processing.

At this time, in case of which the processor executes computational processing, the main memory is used also as a means to store data required for the processor to execute computations, data for computational processing, and computation results.

It may not be absolutely necessary to load commands and data required for executing process of the processor from the secondary storage device into the main memory. For example, In case of which the plural computers with which a computing system is provided are mutually connected by a network, commands and data required for executing process of the processor are stored by the main memory via the network. Also, if the computers with which a computing system is provided are mutually connected by high-speed I/O devices, commands and data required for executing process of the processor are stored by the main memory via the high-speed I/O devices.

The main memory in a computing system records data by whether or not a charge has accumulated in a capacitor. Specifically, in case of which the capacitor stores a charge, "1" is stored, and in case of which the capacitor does not store a charge, "0" is stored. An operation (refresh) for maintaining the data stored by the main memory must be executed.

The main memory usually has plural power control management modes, and can usually change to another mode via a memory controller or the like. For example, it can change from a normal mode to a low power mode.

In the low power mode, although power consumption is low compared with the normal mode, the speed with which the processor accesses the memory decreases. The main memory may be, for example, a DRAM (Dynamic Random Access Memory) or SRAM (Static Random Access Memory).

The power mode of the main memory is also changed by the memory controller in units of memory rank divided by the main memory. A memory rank is a unit in which the memory controller can control power independently.

In order to reduce the power consumed by the computing system, the memory controller has a logical/physical address translation table, and the memory controller operates the translation table so that the used memory area can be concentrated in any desired memory device. Alternatively, the operating system manages an unused memory list for each memory device, and allocates memory starting from memory devices which have little unused memory (memory usage is high). By this process, the memory controller changes over the power mode of an unused memory device to the low power mode (e.g., U.S. Pat. No. 6,954,837).

A technique is also known wherein only a memory device in which data is stored is periodically refreshed, in order to reduce the power consumed by the memory device (e.g., U.S. Pat. No. 6,215,714).

In a parallel computing system, from the viewpoint of solving the problem of the heat generated in the computing system, and energy-saving, temperature distribution information is generated based on the temperature information detected by a temperature sensor. A method is known for executing the process of job scheduling of the computers in a parallel computing system based on the generated temperature distribution information (e.g., JP 2004-126968 A).

On the other hand, in a technique for reducing the power consumed by the processor, a command for operating a computing circuit is first detected, and the computing circuit to be operated is activated first. Another technique is known where, after computations by the computing circuit are completed, the activated computing circuit is inactivated (e.g., JP 2005-235204 A).

SUMMARY OF THE INVENTION

In the prior art, the majority of power reduction techniques are aimed at reducing power consumption of the processor in a computer. On the other hand, the power consumption of the memory was hardly controlled. For example, the technique disclosed in JP 2005-235204 A is a technique for reducing the power consumed by the computing circuit in the processor.

The techniques disclosed in U.S. Pat. No. 6,954,837 and U.S. Pat. No. 6,215,714 are techniques for reduction control of the power consumed by the main memory at the hardware level. In general, physical memory resources are directly managed by basic system software (Operating System etc.). The basic system software also controls processes using physical memory resources, and manages processes using physical memory resources.

In practice, therefore, it is very difficult to effectively reduce the power consumed by the memory only at the hardware level without cooperating with basic system software.

Even with the assistance of basic system software, in a method where power supply to the memory device is simply interrupted in case of which the whole memory device is unused, and memory devices with a high usage frequency are allocated by a program, the used memory area becomes fragmented. In case of which the memory is managed by the operating system, fragmentation of this used memory area is inevitable.

There are parallel computing systems wherein plural computers are connected to each other via a network or high-speed I/O devices, and the plural computers execute processing in parallel. In such a parallel computing system, basic system software assigns to a computer which is desired to have executed a program, computing job or process. Therefore, in the case of a parallel computing system, to reduce the power which the main memory consumes, the assistance of basic system software is indispensable.

When the power consumed by a memory changes from a low power mode to a normal power mode state in which write/read to and from the memory are possible, a delay (latency) occurs in accessing the memory from the processor. For this reason, the capability of the processor to access the memory falls.

In the technique disclosed in U.S. Pat. No. 6,954,837, a memory device of a high usage frequency is allocated to the program executed, and power consumed by unused memory devices is reduced. However, if the computing system continues operating, the area used by the memory device will become fragmented. Also, the technique described in U.S. Pat. No. 6,954,837 is aimed at a computing system having a single computing node. Therefore, the technique disclosed in U.S. Pat. No. 6,954,837 cannot deal with a parallel computing system having plural computer nodes connected via a network or high-speed I/O device.

In the technique described in U.S. Pat. No. 6,954,837, the power consumed by the main memory cannot be reduced in the case where a program, computing job, or process is allocated a computing node which executes the program, computing job, or process among plural computing nodes. In particular, in the technique disclosed in U.S. Pat. No. 6,954,837, the latency generated by changing over the power mode of a memory cannot be concealed.

In the technique described in U.S. Pat. No. 6,215,714, on the other hand, to maintain the data stored by the memory currently in use, the power mode of the memory device is changed over to a refresh mode wherein the power consumed by memory is low. The power consumed by the memory device can thereby be reduced.

The area currently used by each program is fragmented among plural memory devices. In this case, in the technique disclosed in U.S. Pat. No. 6,215,714, the power mode of the memory device cannot be changed over to the refresh mode. Therefore, the power consumed by the main memory cannot be reduced with a high degree of certainty.

In the technique disclosed in U.S. Pat. No. 6,215,714, the power consumed by the main memory cannot be reduced when a program, computing job, or process is allocated a computing node which executes the program, computing job, or process among plural computing nodes. Also, in the technique described in U.S. Pat. No. 6,215,714, the latency generated by changing the power mode of the memory cannot be concealed.

In the technique described in JP 2004-126968 A, scheduling of computing jobs is executed so that the temperature distribution of the parallel computing system is uniform. Hence, system failures due to thermal density increases can be avoided. However, this technique does not reduce the power consumed by all of the hardware (including the main memory) in the parallel computing system.

According to one embodiment of the invention, there is therefore provided a computer system comprising a first processor, a memory unit coupled to said first processor which stores a user program, a control node having a first interface coupled to other nodes, a second processor that performs a computational processing, a memory coupled to the second processor, a second interface coupled to the second processor and coupled to the control node, and a computing node provided with a memory controller coupled to the memory, wherein the computing node executes a user computing program sent by the control node, and a storage area of the memory is divided into memory ranks which are in units which the memory controller can control power independently, a supplied power state of the memory is controlled, for each of the memory ranks, to one of an active state in which the storage area included in the memory rank can be accessed from the second processor, and an inactive state in which access from the second processor to the storage area is delayed, the first processor sends a message including a memory capacity required to execute the user program, and, in case of which the second processor receives the message sent from the first processor, the second processor puts the memory rank corresponding to the required memory capacity into the active state before the user program is loaded into the memory.

According to this embodiment of the invention, the power consumed by the memory can be substantially reduced without affecting the capability of the processor to access the memory.

BRIEF DESCRIPTION OF THE DRAWINGS

The present invention can be appreciated by the description which follows in conjunction with the following figures, wherein:

FIG. 3 is a drawing showing the structure of a memory addressing mode table according to the first embodiment of the invention;

FIG. 5 is a schematic diagram of a memory power mode table according to the first embodiment of the invention;

FIG. 6 is a drawing showing the structure of a memory zone-power rank zone state management table according to the first embodiment of the invention;

FIG. 7 is a drawing showing the structure of a computing computer node information table according to the first embodiment of the invention;

FIG. 8 is a drawing showing the structure of a remote process estimated memory amount table according to the first embodiment of the invention;

FIG. 16 is a drawing showing the structure of a used memory power rank policy table according to the second embodiment of the invention;

DETAILED DESCRIPTION OF THE PREFERRED EMBODIMENT

First Embodiment

A first embodiment of the invention will now be described referring to FIGS. 1 to 14.

Figure 1:
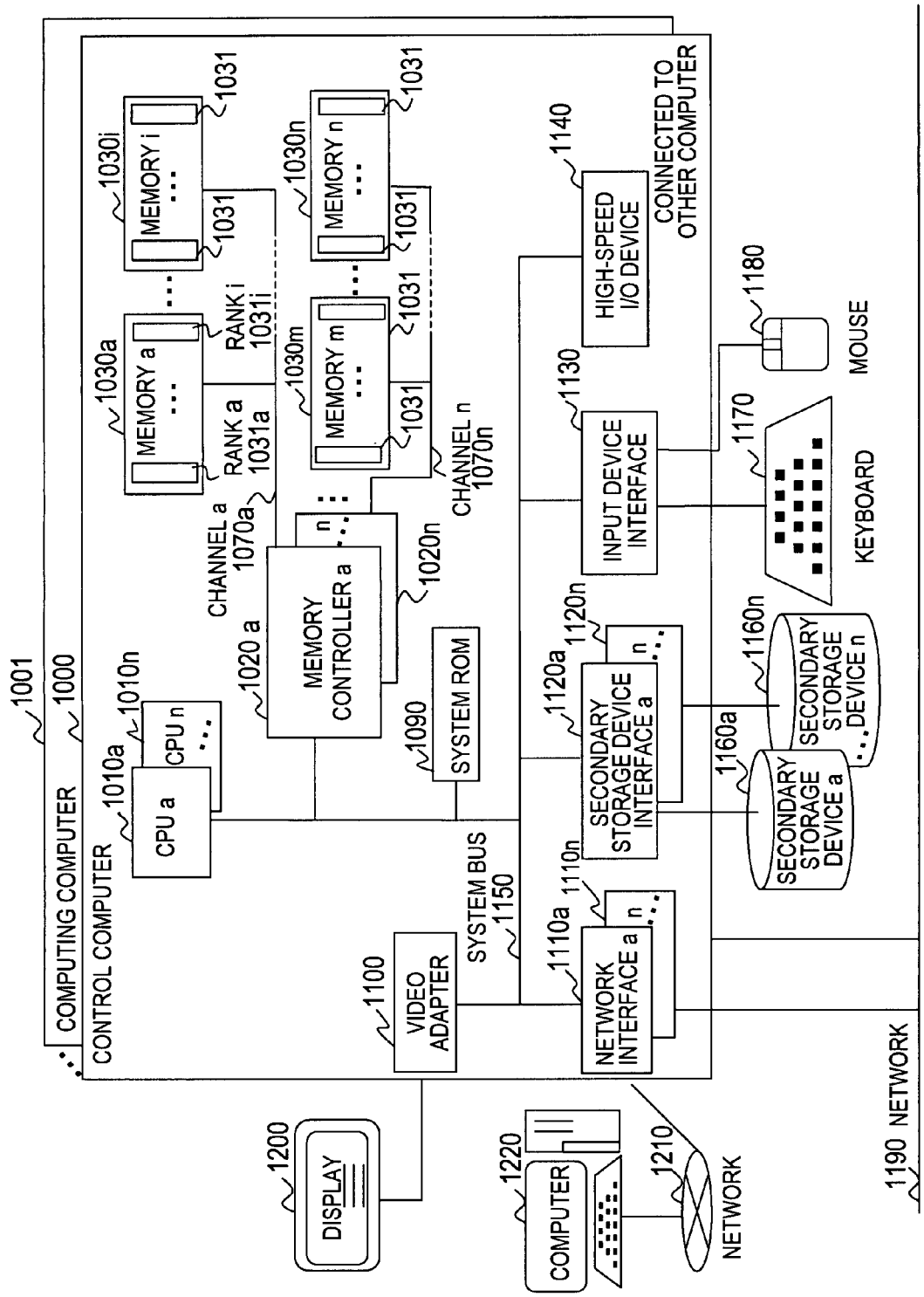
FIG. 1 is a drawing showing the structure of a computing system according to a first embodiment of the invention.

FIG. 1 is a drawing showing the structure of the computing system according to the first embodiment of the invention.

The computing system of the first embodiment is provided with a control computer 1000 and a computing computer 1001. Since the hardware constitutions of the control computer 1000 and the computing computer 1001 are identical, the hardware constitution of the control computer 1000 will be described as an example. The control computer 1000 comprises processors (hereafter, CPU) 1010a to 1010n (hereafter, the CPU 1010a to 1010n will be referred to collectively as CPU 1010), memory controllers 1020a to 1020n (hereafter, the memory controllers 1020a to 1020n will be referred to collectively as the memory controller 1020), memories 1030a to 1030n (hereafter, the memories 1030a to 1030n will be referred to collectively as the memory 1030), system ROM 1090, video adapter 1100, network interfaces 1110a to 1110n (hereafter, the network interfaces 1110a to 1110n will be referred to collectively as the network interface 1110, secondary storage device interfaces 1120a to 1120n (hereafter, the secondary storage device interfaces 1120a to 1120n will be referred to collectively as the secondary storage device interface 1120), input device interface 1130 and high-speed I/O device 1140. These are respectively connected by a system bus 1150.

The memory 1030a and memory 1030i are connected to the memory controller 1020a via a channel 1070a. The memory 1030m and memory 1030n are connected to the memory controller 1020n via a channel 1030n. The CPU 1010 loads various programs from the memory 1030, and executes these programs. The memory controller 1020 controls the memory 1030. Firmware is stored in the system ROM 1090. The firmware contains basic data about the hardware with which the control computer 1000 is provided. The firmware also executes basic control of the hardware with which the control computer 1000 is provided.

Data required for the CPU 1010 to execute various programs are temporarily stored in the memory 1030. After these programs are executed, the execution results of the programs are temporarily stored in the memory 1030.

The memory 1030 is divided into memory ranks 1031. The memory ranks 1031 are the minimum units whose power can be independently controlled by memory controller 1020. For example, the memory 1030a is divided into memory rank 1031a to memory rank 1031i.

The memory controller 1020 has at least an addressing function which defines a memory address in the memory 1030, and a memory accessing function accessed by the CPU 1010. The memory controller 1020 also has an interface used to control the power of the memory 1030. The control computer 1000 is connected to a keyboard 1170 and a mouse 1180 via an input device interface 1130. The control computer 1000 is connected to a display 1200 via a video adapter 1100. The control computer 1000 is connected to secondary memories 1160a to 1160n (hereafter, the secondary memories 1160a to 1160n will be referred to collectively as the secondary memory 1160) via the secondary storage device interface 1120.

The control computer 1000 is connected to a network 1190 via the network interface 1110. The control computer 1000 is connected to the computing computer 1001 via a network 1190. A parallel computing system which executes computing process in parallel is thereby formed from plural computers.

The control computer 1000 may be connected to the computing computer 1001 also via a high-speed I/O device 1140.

The computing computer 1001 may be in the form of a board. In case of which the computing computer 1001 is in the form of a board, the computing computer 1001 is provided with a CPU 1010, memory controller 1020, memory 1030, system ROM 1090, and high-speed I/O device 1140. In this case, the computing computer 1001 is connected to the control computer 1000 by inserting the high-speed I/O device 1140 with which the computing computer 1001 is provided. An example of a case where the computing computer 1001 is in the form of a board, is an accelerator board.

A parallel computing system may also be formed wherein the control computer 1000 is connected to the computing computer 1001 via the network 1190, and to the computing computer 1001 via the high-speed I/O device 1140.

The control computer 1000 is connected to a network 1210 via a network interface 1110. The control computer 1000 is connected to a computer 1220 in a remote location via the network 1210. For example, a user who is in a remote location can manage the parallel computing system using the computer 1220.

In FIG. 1, plural CPU 1010, memory controllers 1020, memories 1030, network interfaces 1110 and secondary storage device interfaces 1120 are shown, but there may be only one of each. Also, there may be one or more of the control computer 1000 and the computing computer 1001, but there must be at least one of the control computers 1000.

Figure 2:
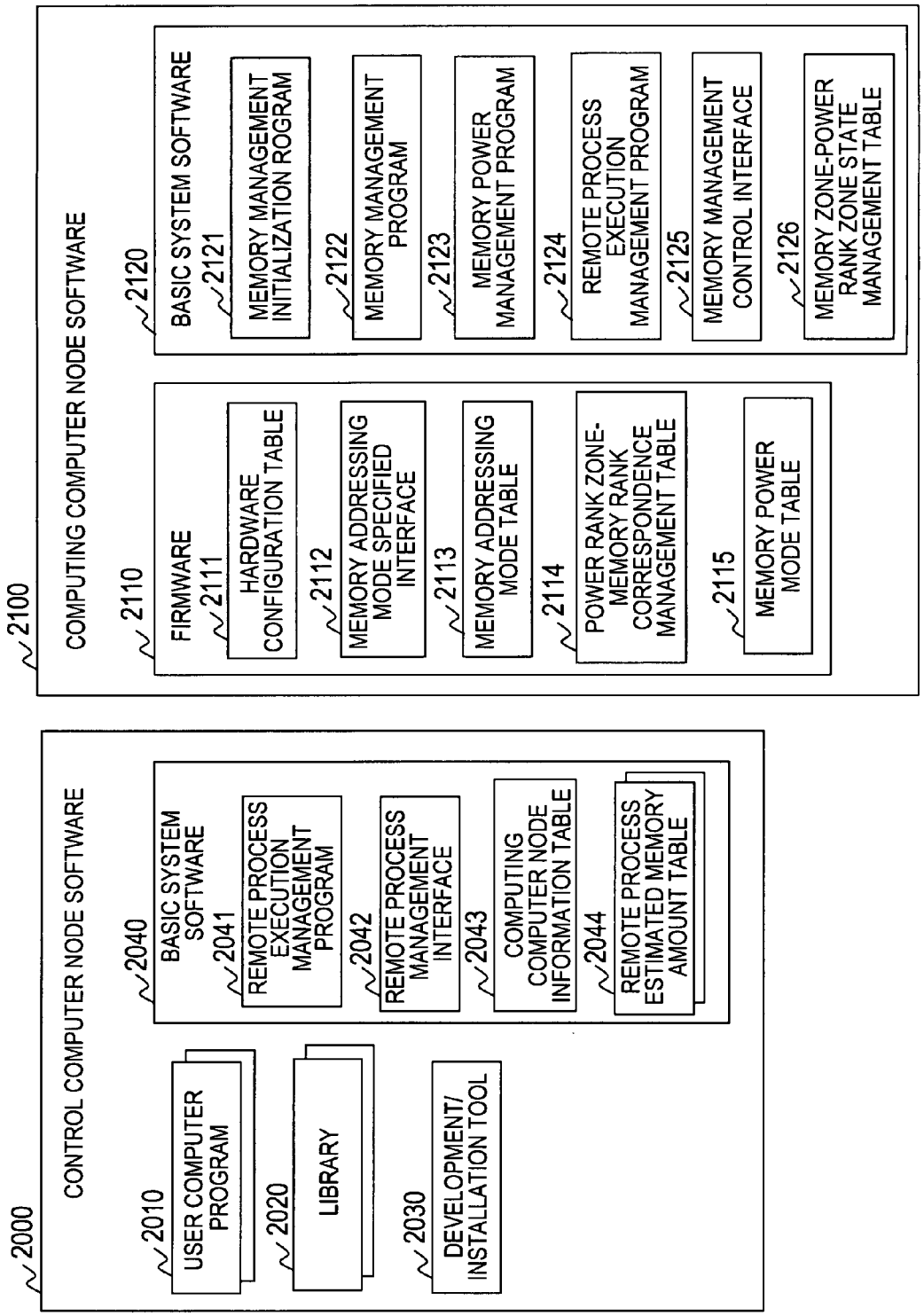
FIG. 2 is a drawing showing the structure of a control computer node software and computing computer node software according to the first embodiment of the invention.

FIG. 2 is a diagram showing the structure of the control computer node software 2000 and the computing computer node software 2100 according to the first embodiment of the invention.

The control computer node software 2000 is executed by the control computer 1000. The computing computer node software 2100 is executed by the computing computer 1001.

The control computer node software 2000 has at least a function to make the computing computer 1001 execute the user computing program 2010 as a remote process, and a function to manage the remote process. The computing computer node software 2100 has at least a function to execute the remote process assigned by the control computer node software 2000.

For example, when a user wishes the computing computer 1001 to execute a remote process at high speed, it is better to increase the number of computing computers 1001 with which the parallel computing system is provided, than the number of the control computers 1000 with which the computing system is provided.

First, the control computer node software 2000 will be described.

The control computer node software 2000 is loaded into the memory 1030 with which the control computer 1000 provided, and is executed by the CPU 1010 with which the control computer 1000 is provided. The control computer node software 2000 includes a user computing program 2010, library 2020, development/installation tool 2030, and basic system software 2040.

The user computing program 2010 is a user application program which uses a computing system. The library 2020 is a program executed as part of the user computing program 2010.

The development/installation tool 2030 is a program used for development of the user computing program 2010. The development/installation tool 2030 is also a program used for installation of the user computing program 2010. The development/installation tool 2030 may be for example a compiler, a linker, or a file installation program. The basic system software 2040 manages the hardware with which the control computer 1000 is provided. The basic system software 2040 also provides the user with a software interface. For example, the basic system software 2040 is an operating system and a hypervisor.

The control computer node software 2000 is stored in a secondary memory 1160 connected to the control computer 1000. The control computer node software 2000 may be stored in plural sets of the secondary memories 1160 to safeguard against a fault occurring in the secondary memory 1160. The control computer node software 2000 may be distributed by the computer 1220 connected to the control computer 1000 via a network 1210.

The control computer node software 2000 may also be stored by the computing computer 1001 or another control computer 1000. In this case, the computing computer 1001 or other control computer 1000 which stores the control computer node software 2000, distributes the control computer node software 2000 to the control computer 1000 via the network 1190 or the high-speed I/O device 1140.

The basic system software 2040 includes a remote process execution control program 2041, remote process control interface 2042, computing computer node information table 2043, and remote process estimated memory amount table 2044.

The remote process execution control program 2041 assigns the content to be executed by the user computing program 2010 on the computing computer 1001, to the computing computer 1001 as a remote process.

The remote process execution management interface 2042 is a program which functions as an interface permitting modification of the parameters and settings relating to management of the remote process executed by the computing computer 1001.

The computing computer node information table 2043 shows the state of the computing computer 1001 which executes the remote process.

The computing computer node information table 2043 will now be described in detail referring to FIG. 7.

The remote process estimated memory amount table 2044 shows the capacity of the memory 1030 required for the computing computer 1001 to execute a remote process. The remote process estimated memory amount table 2044 will now be described in detail referring to FIG. 8.

The user computing program 2010 is started by the control computer 1000. The computing computer 1001 assigned by the remote process execution control program 2041 executes processing of the user computing program 2010 as a remote process.

The library 2020 required for processing of the user computing program 2010 is also executed by the computing computer 1001.

Next, the computing computer node software 2100 will be described.

The computing computer node software 2100 is loaded into the memory 1030 with which the computing computer 1001 is provided, and is executed by the CPU 1010 with which the computing computer 1001 is provided.

The computing computer node software 2100 includes a firmware 2110 and a basic system software 2120. The firmware 2110 stores the basic data of the hardware with which the computing computer 1001 is provided. The firmware 2110 also executes basic control to the hardware with which the computing computer 1001 is provided.

The basic system software 2120 manages the hardware with which the computing computer 1001 is provided. The basic system software 2120 provides the user with a software interface.

The basic system software 2120 may be for example an operating system and a hypervisor.

The firmware 2110 is stored in the system ROM 1090 with which the computing computer 1001 is provided. The basic system software 2120 is also stored in the secondary memory 1160 connected to the computing computer 1001. The basic system software 2120 may be stored in plural sets of the secondary memories 1160 as a safeguard in the case where a fault occurs in the secondary memory 1160.

The basic system software 2120 may be distributed by the computer 1220 connected to the computing computer 1001 via a network 1210. The basic system software 2120 may be distributed also by the control computer 1000 or another of the computing computers 1001. For example, after the control computer 1000 is started, the started computer 1000 may distribute the basic system software 2120 to the computing computer 1001 to which the started control computer 1000 is connected via a network 1190.

The firmware 2110 includes a hardware configuration table 2111, memory addressing mode specification interface 2112, memory addressing mode table 2113, power rank zone-memory rank correspondence management table 2114, and a memory power mode table 2115.

Basic data regarding the configuration of the hardware with which the computing computer 1001 is provided are registered in the hardware configuration table 2111.

A memory addressing mode specification interface 2112 is a program which functions as an interface specifying a method for assigning a memory address to the memory 1030 from an input device. The method for assigning a memory address to the memory 1030 is registered in a memory addressing mode table 2113.

The memory addressing mode table 2113 will now be described in detail referring to FIG. 3.

Power rank zones showing continuous memory addresses with a controllable power mode by the memory controller 1020 with which the computing computer 1001 is provided, and a memory rank 1031 including in the power rank zone are registered in the power rank zone-memory rank correspondence management table 2114. The power rank zone-memory rank correspondence management table 2114 will now be described in detail referring to FIG. 4.

The memory power mode table 2115 includes a power mode which can be changed over by the memory 1030 with which the computing computer 1001 is provided, the power consumed by the memory 1030 in each power mode, and the delay time of access from the CPU 1010 in case of which the memory 1030 changes over the power mode.

The basic system software 2120 includes a memory management initialization program 2121, memory management program 2122, memory power management program 2123, remote process execution control program 2124, memory management control interface 2125, and memory zone-power rank zone state management table 2126.

The memory management initialization program 2121 initializes data required for control and management of the memory 1030 with which the computing computer 1001 is provided. The memory management initialization program 2121 also makes preparations which provide the user with an interface for the memory 1030 with which the computing computer 1001 is provided.

The processing of the memory management initialization program 2121 will be described in detail referring to FIG. 9.

The memory management program 2122 executes control and management of the memory 1030 with which the computing computer 1001 is provided. The memory management program 2122 also provides the user with an interface for the memory 1030 with which the computing computer 1001 is provided.

The memory power management program 2123 controls the power mode of the memory rank 1031 via the memory controller 1020. The remote process execution control program 2124 executes the user computing program 2010 assigned by the control computer 1000. The remote process execution control program 2124 also manages remote processes.

The memory management control interface 2125 is a program functioning as an interface which enables modification of parameter settings relating to management of the memory 1030. In the memory zone-power rank zone state management table 2126, a memory zone for each continuous memory address, a power rank zone including in each continuous memory address range, the power consumed by each power rank zone, and the state of usage by each power rank zone, are managed. The memory zone-power rank zone state management table 2126 will be described in detail referring to FIG. 6.

The basic system software 2120 controls the power consumed by the memory 1030 in power rank zone units covering one or more of the memory ranks 1031.

FIG. 3 is a drawing showing the structure of the memory addressing mode table 2113 according to the first embodiment of the invention.

The memory addressing mode table 2113 is managed by the firmware 2110.

The memory addressing mode table 2113 includes an addressing mode 3000 and an addressing method 3100.

A unique identifier whereby a memory address is allocated to the memory 1030 is registered in the addressing mode 3000. The user determines the method by which a memory address is allocated to the memory 1030 based on the identifier registered in the addressing mode 3000. The method whereby a memory address is allocated to the memory 1030, is registered in an addressing method 3100. Here, the memory address is a unique identifier showing the location where the CPU 1010 accesses the memory 1030.

Next, the method whereby the memory address registered in the addressing method 3100 is allocated to the memory 1030, will be described.

In a normal mode 3200, the memory controller 1020 allocates a memory address from the memory 1030*a* connected to the memory controller 1020 via the channel 1070*a*. The memory controller 1020 then allocates a memory address to the memory 1030*b* connected to the memory controller 1020 via the channel 1070*a*. Next, the memory controller 1020 allocates memory addresses sequentially from the memory 1030*m* connected to the memory controller 1020 via the channel 1070*n*.

In a full interleave mode 3300, the memory controller 1020 allocates a memory address alternately between the memories 1030*a* to 1030*b* connected to the memory controller 1020 via the channel 1070*a*, and the memories 1030*m* to 1030*n* connected to the memory controller 1020 via the channel 1070*n*, to all the channels 1070*a* to 1070*n* for each predetermined interleave size.

"Alternately" means that if, for example, a memory address of a certain number is allocated to the memory 1030*a*, the memory address of the following number is allocated to the memory 1030*b*. This is identical in the following power control modes.

In an m channel interleave mode 3400, the memory controller 1020, taking m channels as one unit, allocates a memory address for each predetermined interleave size alternately between the memories 1030*a* to 1030*b* connected to the memory controller 1020 via the channel 1070*a*, and the memory 1030 connected to the memory controller 1020 via a channel m-1, and this is repeated up to the memories 1030*m* to 1030*n* connected to the memory controller 1020 via the channel 1070*n*.

In a full interleave/power control mode 3500, the memory controller 1020 allocates a memory address for each size of the memory rank 1031 alternately between the memories 1030*a* to 1030*b* connected to the memory 1030 via the channel 1070*a*, and the memories 1030*m* to 1030*n* connected via the channel 1070*n*, to all the channels 1070*a* to 1070*n*.

In a m channel interleave/power control mode 3600, the memory controller 1020, taking m channels as one unit, allocates a memory address for each predetermined interleave size alternately between the memories 1030*a* to 1030*b* connected to the memory controller 1020 via the channel 1070*a*, and the memory 1030 connected to the memory controller 1020 via the channel m-1, and this is repeated up to the channel 1070*n*.

Here, interleave means that when a memory address is allocated alternately to the memory 1030 connected to the channel 1070, memory addresses are allocated continuously spanning plural channels 1070. Hence, the CPU 1010 can accelerate access to the continuous memory addresses.

Interleave size means the capacity of the memory address allocated to one of the channels 1070. The memory controllers 1020 to 1021 allocate memory addresses so that interleave is executed for each interleave size.

Frequently, the interleave size is the cache line size of the CPU 1010. The interleave size which is the cache line size is smaller than the size of a memory page frame. For this reason, since the memory address is allocated so that plural of the channels 1070 can be spanned, one memory page frame covers plural memory addresses. Therefore, since one memory page frame spans plural memory ranks 1031, power control of the memory 1030 is not efficient.

Hence, the full interleave mode 3300 and the m channel interleave mode 3400 to which a memory address is allocated for each interleave size are not suitable for memory power reduction.

The interleave size of the full interleave power control mode 3500, and m channel interleave power control mode 3600, are set to values equal to the size of the memory rank 1031. Since the rank size of the memory rank 1031 is larger than the size of a memory page frame, one or plural memory page frames are included in one of the memory ranks 1031, so efficient memory power control can be executed.

Also, in the normal mode 3200, memory addresses are allocated sequentially from the memory rank 1031, i.e., a memory address is allocated for each memory rank 1031, so efficient memory power control can be executed.

The addressing mode 3000 of the memory addressing mode table 2113 is usually set beforehand as the normal mode 3200 by the firmware 2110.

Also, the user can select the addressing mode 3000. Specifically, when the computing computer 1001 is started and the firmware 2110 is executed, the addressing mode 3000 can be selected via the memory addressing mode specification interface 2112 using an input device such as the keyboard 1170 of the computers 1000 to 1001.

The user can also change the information (interleave size, number of interleave channels 1070) set in the memory addressing mode table 2113.

The user may also select the addressing mode 3000 via the memory addressing mode specification interface 2112 using the computer 1220 connected to the computing computer 1001 via the network 1210.

Alternatively, the user may modify the information registered in the memory addressing mode table 2113 via the memory addressing mode specification interface 2112, using the network 1220 connected to the computing computer 1001 via the network 1210.

Figure 4:
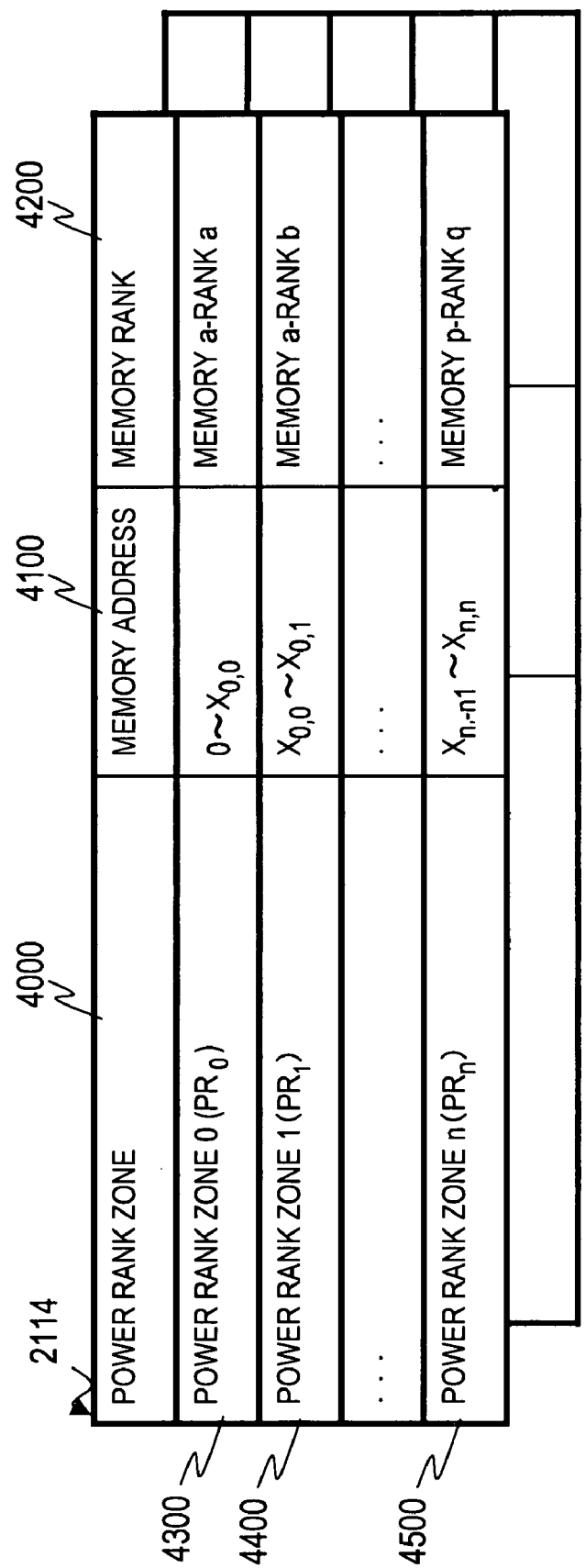
FIG. 4 is a drawing showing the structure of a power rank zone-memory rank correspondence management table according to the first embodiment of the invention.

FIG. 4 is a drawing showing the structure of the power rank zone-memory rank correspondence management table 2114 according to the first embodiment of the invention.

The power rank zone-memory rank correspondence management table 2114 is managed by the firmware 2110. The power rank zone-memory rank correspondence management table 2114 includes a power rank zone 4000, memory address 4100, and memory rank 4200.

An identifier of a power rank zone constituted so that the number of the memory ranks 1031 which form a continuous memory address area is a minimum, is registered in the power rank zone 4000. The basic system software 2120 controls the power consumed by the memory 1030 in power rank zone 4000 units.

The memory address of the continuous memory address area including in the power rank zone 4000 is registered in the memory address 4100. An identifier of the memory rank 1031 including in the power rank zone 4000 is registered in the memory rank 4200.

For example, the power rank zone 0 ($PR_0$) 4300 is constituted by the memory addresses 0 to $X_{0,0}$ and the memory rank 1031a provided to the memory 1030a.

In case of which the basic system software 2120 is executed, the power rank zone-memory rank correspondence management table 2114 is loaded, for example to the memory 1030. Due to this, the basic system software 2120 can refer the power rank zone-memory rank correspondence management table 2114.

The information registered in the power rank zone-memory rank correspondence management table 2114 is set beforehand by the firmware 2110 based on the memory address allocated to the memory 1030. A memory address is allocated to the memory 1030 based on the addressing mode 3000 selected in the memory addressing mode table 2113.

In case of which the information registered in the memory addressing mode table 2113 is changed by the user, the memory address allocated to the memory 1030 is changed.

Therefore, since the memory address is changed, the firmware 2110 detects the minimum memory rank 1031 that constitutes the changed continuous memory address area.

The firmware 2110 then registers the changed continuous memory address in the memory address 4100, and registers the identifier of the detected memory rank in the memory rank 4200. Due to this, the firmware 2110 modifies the power rank zone-memory rank correspondence management table 2114.

In case of which the power rank zone-memory rank correspondence management table 2114 is modified, and data for the channel 1070, memory 1030 and memory rank 1031 are required, the firmware 2110 refers the hardware configuration table 2111 in which these data are registered.

The basic system software 2120 may also generate the power rank zone-memory rank correspondence management table 2114 by referring the memory addressing mode table 2113 and the hardware configuration table 2111. The basic system software 2120 may add a new entry to the power rank zone-memory rank correspondence management table 2114. The basic system software 2120 may modify the information registered in the power rank zone-memory rank correspondence management table 2114.

Also, the power rank zone-memory rank correspondence management table 2114 may be generated for each addressing mode (3200 to 3600) corresponding to each addressing mode (3200 to 3600) of the memory addressing mode table 2003.

FIG. 5 is a schematic diagram of the memory power mode table 2115 according to the first embodiment of the invention.

The memory power mode table 2115 is managed by the firmware 2110. The memory power mode table 2115 includes a power mode 5000, power consumption 5100, and mode change-over latency 5200.

An identifier of the power mode of the memory rank 1031 which can be changed over, is registered in the power mode 5000. The value of the power consumed by the memory rank 1031 in each power mode is registered in the power consumption 5100.

The value of the delay time (latency) of access from the CPU 1011 generated in case of which the memory rank 1031 changes over from one power mode to another power mode, is registered in the mode change-over latency 5200.

For example, three power modes (5300 to 5500) are registered in the memory power mode table 2115 shown in FIG. 5.

In case of which the memory rank 1031 is in power mode 0 (Standby) 5300, the power consumed by the memory rank 1031 per hour is $X_0$. Also, since it is the present power mode in case of which the memory ranks of power mode 0 (Standby) 5300 change to the power mode 0, latency is not generated.

In case of which the memory rank 1031 in the power mode 0 (Standby) 5300 changes to the power mode 0, since the new power mode 0 is the present power mode, latency is not generated.

The latency generated in case of which the memory rank 1031 in the power mode 0 (Standby) 5300 changes to the power mode 1 is $Y_{0,1}$. The latency generated in case of which the memory rank 1031 in the power mode 0 (Standby) 5300 changes to the power mode 2 is $Y_{0,2}$.

The CPU 1010 can access the memory ranks 1031 to 1062 of the power mode 0 (Standby) 5300.

Moreover, the CPU 1010 cannot access the memory rank 1031 in the power mode 1 (Power Down) 5400 and power mode 2 (Self-refresh) 5500, without generating a delay.

Hence, if the power mode 5000 of the memory rank 1031 does not change to the power mode 0 (Standby) 5300, the CPU 1010 cannot execute read from/ write to the memory rank 1031. As for the power consumed by the memory ranks 1031 to 1062, $X_2$ of power mode 2 (Self-refresh) 5500 is the lowest, next, $X_1$ of power mode 1 (Power Down) is low, and $X_0$ of power mode 0 (Standby) 5300 is the highest.

Power mode 0 (Standby) 5300 is the active state, whereas power mode 1 (Power Down) 5400 and power mode 2 (Self-refresh) 5500 are the inactive state.

The information in the memory power mode table 2115 is set beforehand by the firmware 2110 based on the data constituting the memory 1030 with which the computing computer 1001 is provided.

FIG. 6 is a diagram showing the structure of the memory zone-power rank zone state management table 2126 according to the first embodiment of this invention.

The memory zone-power rank zone state management table 2126 is managed by the basic system software 2120.

The memory zone-power rank zone state management table 2126 includes a memory zone 6000, address range 6010, power rank zone 6020, power rank zone size 6030, power state 6040, and number of unused memory page frame 6050.

An identifier of the memory zone managed by the basic system software 2120 corresponding to the range of memory addresses is registered in the memory zone 6000.

The memory address included in each memory zone 6000 is registered in the address range 6010. An identifier of the power rank zone included in the address range 6010 is registered in the power rank zone 6020. The capacity of the power rank zone of the identifier registered in each power rank zone 6020 is registered in the power rank zone size 6030.

An identifier of the power mode of the memory rank 1031 including in the power rank zone of the identifier registered in each power rank zone 6020, is registered in the power state 6040. The number of unused memory page frames not used by the software executed by the computing computer 1001 of the memory page frames provided to the memory rank 1031 including in the power rank zone of the identifier registered in each power rank zone 6020, is registered in the number of unused memory page frame 6050.

For example, the memory zone-power rank zone state management table 2126 shown in FIG. 6 manages three memory zones (6060, 6070, 6080) and power rank zones (6061 to 6062, 6071 to 6072, 6081 to 6082) in each memory zone.

The memory zone Zone 0 (6060) includes the memory addresses of the address range 0 to $X_0$, and the Zone 0 (6060) includes the power rank zones $PR_0$ to $PR_{x0}$ (6061 to 6062).

The power rank zone $PR_0$ (6061) has a capacity of $RS_0$, the power mode of the power rank zone $PR_0$ is $PS_0$, and the memory page frame number which is not used by each software in the power rank zone $PR_0$ (6081) is $Su_0$.

An identifier registered in the power rank zone 400 for which the memory address range of the memory addresses 4100 in the power rank zone-memory rank correspondence management table 2114 is within the memory address range 6100, is registered in the power rank zone 6020.

The information registered in the memory zone-power rank zone state management table 2126 is set by the memory management initialization program 2121 when the computing computer 1001 is started. Also, while the computing computer 1001 is running, the information registered in the memory zone-power rank zone state management table 2126 is updated by the memory management program 2122.

FIG. 7 is a diagram showing the structure of the computing computer node information table 2043 according to the first embodiment of the invention.

The computing computer node information table 2043 is managed by the basic system software 2040. The computing computer node information table 2043 includes a computing computer node 7000, node state 7010, node identifier 7020, and implemented memory 7030.

The name of the computing computer 1001 which executes a remote process assigned by the control computer 1000, is registered in the computing computer node 7000. A value which shows the state of each computing computer 1001 is registered in the node state 7100. For example, Running is registered in the node state 7100. Running shows the state when the computing computer 1001 is running, and a remote process can be executed.

A unique identifier of each computing computer 1001 is registered in the node identifier 7020. For example, the hardware address (MAC address) allocated to the network interface 1110 with which the computing computer 1001 is provided, is registered in the node identifier 7020. Since the hardware address allocated to the network interface 1110 is a unique identifier of the network interface 1110, it can be used as a unique identifier of the computing computer 1001 provided with the network interface 1110.

Also, the IP address of the computing computer 1001 may be registered as a unique identifier of the computing computer 1001 registered in the node type 7020.

The capacity of the memory 1030 with which each computing computer 1001 is provided is registered in the implemented memory 7030.

One computing computer node information table 2043 shows information about the computing computers 1001 connected to one of the control computers 1000.

For example, the computing computer node information table 2043 in FIG. 7 shows that the names of the computing computers 1001 connected to the control computer 1000 are Node p (7040), Node q (7050), and Node r (7060).

The computing computer node information table 2043 in FIG. 7 shows that the node states of the computing computers 1001 whose names are Node p (7040), Node q (7050), and Node r (7060), are running and they can execute a remote process.

The computing computer node information table 2043 shown in FIG. 7, shows that the unique identifier of the computing computer 1001 whose name is Node p (7040) is ID0, the unique identifier of the computing computer 1001 whose name is Node q (7050) is ID1, and the unique identifier of the computing computer 1001 whose name is Node r (7060) is ID2.

Also, the computing computer node information table 2043 shown in FIG. 7, shows that the computing computer 1001 whose name is Node p (7040) has a memory 1030 whose capacity is R0, the computing computer 1001 whose name is Node q (7050) has a memory 1030 whose capacity is R1, and the computing computer 1001 whose name is Node r (7050) has a memory 1030 whose capacity is R2.

When the control computer 1000 is started, the information registered in the computing computer node information table 2043 is registered by the remote process execution control program 2041.

When the node state of the computing computer 1001 is changed, and when the structure of the computing computer 1001 is changed, even if the control computer 1000 is running, the information registered in the computing computer node information table 2043 is updated by the remote process execution control program 2041.

A change in the configuration of the computing computer 1001 occurs, for example, when the memory 1030 with which the computing computer 1001 is provided is changed.

The name of the computing computer 1001 registered in the computing computer node 7000 in the computing computer node information table 2043, is set beforehand.

However, the name of the computing computer 1001 registered in the computing computer node 7000 may be changed by the user.

Specifically, the user changes the name of the computing computer 1001 registered in the computing computer node 7000 using an input device. The name of the computing computer 1001 registered in the computing computer node 7000 may also be changed via the remote process control interface 2042 using the computer 1220 connected to the control computer 1000 via the network 1210.

FIG. 8 is a diagram showing the structure of the remote process estimated memory amount table 2044 according to the first embodiment of this invention.

The remote process estimated memory amount table 2044 is managed by the basic system software 2120 included in the control computer node software 2100.

The remote process estimated memory amount table 2044 includes a program library name 8000, code area 8010, static data area 8020, dynamic data area 8030, temporary data area 8040, sum value 8050, adjustment value 8060, all activation flag 8070, activity confirmation flag 8080, and updating flag 8090.

The name of the user computing program 2010 instructed by a remote process execution control program 2041 included in the control computer node software 2000, to be executed as a remote process by the computing computer 1001, and the name of the library 2020 required to execute this user computing program 2010, are registered in the program library name 8000.

One user computing program 2010 and one library 2020 are registered in the program library name 8000. In case of which there is no library 2020 required to execute the user computing program 2010, the library 2020 is not registered in the program library name 8000.

When the user computing program 2010 and library 2020 whose names are registered in the program library name 8000 are executed as a remote process, to load the code which describes the user computing program 2010 and library 2020, the capacity reserved in the memory 1030 is registered in the code area 8010. In general, this code area is referred to as a text area.

In case of which the user computing program 2010 and library 2020 whose names are registered in the program library name 8000 are executed as a remote process, to load data for which the user computing program 2010 and a library 2020 are not initialized, a capacity reserved in the memory 1030 is registered in a static data area 8020. In general, this data area is referred to as a BSS non-initialized data area.

In case of which the user computing program 2010 and library 2020 whose names are registered in the program library name 8000 are executed as a remote process, a memory area capacity of the user computing program 2010 and library 2020 dynamically reserved in the memory 1030 by the computing computer 1001, is registered in a dynamic data area 8030. In general, this memory area is referred to as a heap area.

In case of which the user computing program 2010 and library 2020 whose names are registered in the program library name 8000 are executed as a remote process, the capacity of the memory area of the user computing program 2010 and library 2020 temporarily reserved in the memory 1030 by the computing computer 10010, is registered in a temporary data area 8040. In general, this memory area is referred to as a stack area.

The sum of the capacity registered in the code area 8010, static data area 8020, dynamic data area 8030 and temporary data area 8040 is registered as a sum value 8050. In other words, the sum value 8050 shows the capacity estimated to be reserved by the computing computer 1001 in the memory 1030, when the computing computer 1001 executes the user computing program 2010 and library 2020 whose names are registered in the program library name 8000.

A value to adjust the sum of the values registered in the sum value 8050 of each entry, is registered as an adjustment value 8060. In other words, the adjustment value 8060 is a value to adjust the value which is estimated to be reserved in the memory 1030 when the computing computer 1001 executes a remote process. The adjustment value 8060 is newly set by the remote process completion processing shown in FIG. 14. The adjustment value 8060 may also be set by the user.

When the computing computer 1001 executes a remote process, a value which shows whether all the memory ranks 1031 with which the computing computer 1001 is provided are activated, is registered in a full activation flag 8070.

After confirming that activation processing has been executed on the memory 1030 with which the computing computer 1001 is provided, a value showing whether or not to execute a remote process is registered in an activity confirmation flag 8080.

After the remote process is executed, a value showing whether or not to update the remote process estimate memory amount table 2044 is registered in an updating flag 8090.

For example, Prog (8100), Lib a (8110), and Lib n (8120) are registered in the program library name 8000 in the remote process estimated memory amount table 2044 shown in FIG. 8. In other words, the computing computer 1001 executes Prog (8100), Lib a (8110), and Lib n (8120) as a remote process.

When Prog 8100 is executed, the code area 8010 reserved in the memory 1030 with which the computing computer 1001 is provided is $C_p$, the static data area 8020 is $Ds_p$, the dynamic data area 8030 is $Dd_p$, and the temporary data area 8040 is $Dt_p$.

When Prog 8100 is executed, the sum value 8050 reserved in the memory 1030 with which the computing computer 1001 is provided, is $C_p + Ds_p + Dd_p + Dt_p$.

Likewise, for Lib 0 8110, the code area 8010 reserved in the memory 1030 with which the computing computer 1001 is provided is $C_{10}$, the static data area 8020 is $Ds_{10}$, the dynamic data area 8030 is $Dd_{10}$, and the temporary data area 8040 is $Dt_{10}$.

When Prog 8100 is executed, the sum value 8050 reserved in the memory 1030 with which the computing computer 1001 is provided, is $C_{10}+Ds_{10}+Dd_{10}+Dt_{10}$.

When Lib n 8120 is executed, the code area 8010 reserved in the memory 1030 with which the computing computer 1001 is provided, is $C_{ln}$, the static data area 8020 is $Ds_{ln}$, the dynamic data area 8030 is $Dd_{ln}$, and the temporary data area 8040 is $Dt_{ln}$.

When Prog 8100 is executed, the sum value 8050 reserved in the memory 1030 with which the computing computer 1001 is provided, is $C_{ln}+Ds_{ln}+Dd_{ln}+Dt_{ln}$.

When a remote process is executed, the adjustment value 8060 which adjusts the value estimated to be reserved by the computing computer 1001, is A.

Since OFF is registered in the full activity flag 8070, not all the memories 1030 with which the computing computer 1001 is provided are activated, but the memory 1030 with which the computing computer 1001 is provided, is activated based on the value registered in the sum value 8050 and the adjustment value 8060.

Also, since OFF is registered in the activity confirmation flag 8080, even if activation processing is not executed by the memory 1030 with which the computing computer 1001 is provided, the computing computer 1001 executes a remote process.

Since ON is registered in the updating flag 8090, after a remote process is executed, the remote process estimated memory amount table 2044 is updated.

Normally, when the user computing program 2010 is installed using the development/installation tool 2030, the remote process estimated memory amount table 2044 is generated via the remote process control interface 2042. An entry is newly added to the remote process estimated memory amount table 2044 via the remote process control interface 2042. The value registered in the remote process estimated memory amount table 2044 is changed via the remote process control interface 2042.

The user may generate the remote process estimated memory amount table 2044 from the input device with which the control computer 1000 is provided. Likewise, the user may newly add an entry to the remote process estimated memory amount table 2044. The user may also change the value registered in the remote process estimated memory amount table 2044.

The user may also generate the remote process estimated memory amount table 2044 via the network 1210 from an input device with which the computer 1220 in the remote location is provided. Likewise, the user may newly add an entry to the remote process estimated memory amount table 2044. Likewise, the user may change the value registered in the remote process estimated memory amount table 2044.

The remote process execution control program 2124 executed by the computing computer 1001 connected to the network 1190 or the high-speed I/O device 1140 may generate the remote process estimated memory amount table 2044 via the remote process control interface 2042 stored by the control computer 1000, newly add an entry to the remote process estimated memory amount table 2044, or change a value registered in the remote process estimated memory amount table 2044.

Plural remote process estimated memory amount tables 2044 are generated by each user computing program 2010.

In general, the values registered in the code area 8010 and the static data area 8020 are written to a file of the user computing program 2010 and the library 2020. Therefore, the values corresponding to the code area 8010 and the static data area 8020 which were written to the file of the user computing program 2010 and the library 2020, are registered in the code area 8010 and the static data area 8020.

In case of which a hint value is shown by the development/installation tool 2030, the hint value is registered in a dynamic data size 8030 and temporary data size 8040. When a hint value is not shown by the development/installation tool 2030, a default value (0) is registered in the dynamic data size 8030 and temporary data size 8040.

The default value may be a value set corresponding to the capacity of the memory with which the computing computer 1001 executing the remote process is provided. The capacity of the memory with which the computing computer 1001 executing a remote process is provided, is a value registered in the implemented memory 7030 in the computing computer node information table 2043.

In the initial state, 0 is registered in the adjustment value 8060. However, a user can change the value registered in the adjustment value 8060.

In case of which the computing computer 1001 once executes the remote process, the differential between the value of the capacity actually reserved by the remote process execution control program 2124 in the memory 1030 and the estimated value, may be reflected in the adjustment value 8050 at the end of the remote process.

OFF is usually registered in the full activation flag 8070. In case of preventing the computing computer 1001 from executing processes other than the remote process (e.g., processing which manages the power of the memory 1030 by the OS), ON is registered in the full activation flag 8070.

OFF is usually registered in the activity confirmation flag 8080. ON is registered in the activity confirmation flag 8080 in the memory 1030 with which the computing computer 1001 is provided to check that the capacity of the memory 1030 required to execute a remote process has been activated without fail. For example, if ON was registered in the activity confirmation flag 8080, ON may be registered in the full activation flag 8070.

ON is usually registered in the updating flag 8090. A user can change the value registered in the updating flag 8090.

Figure 9:
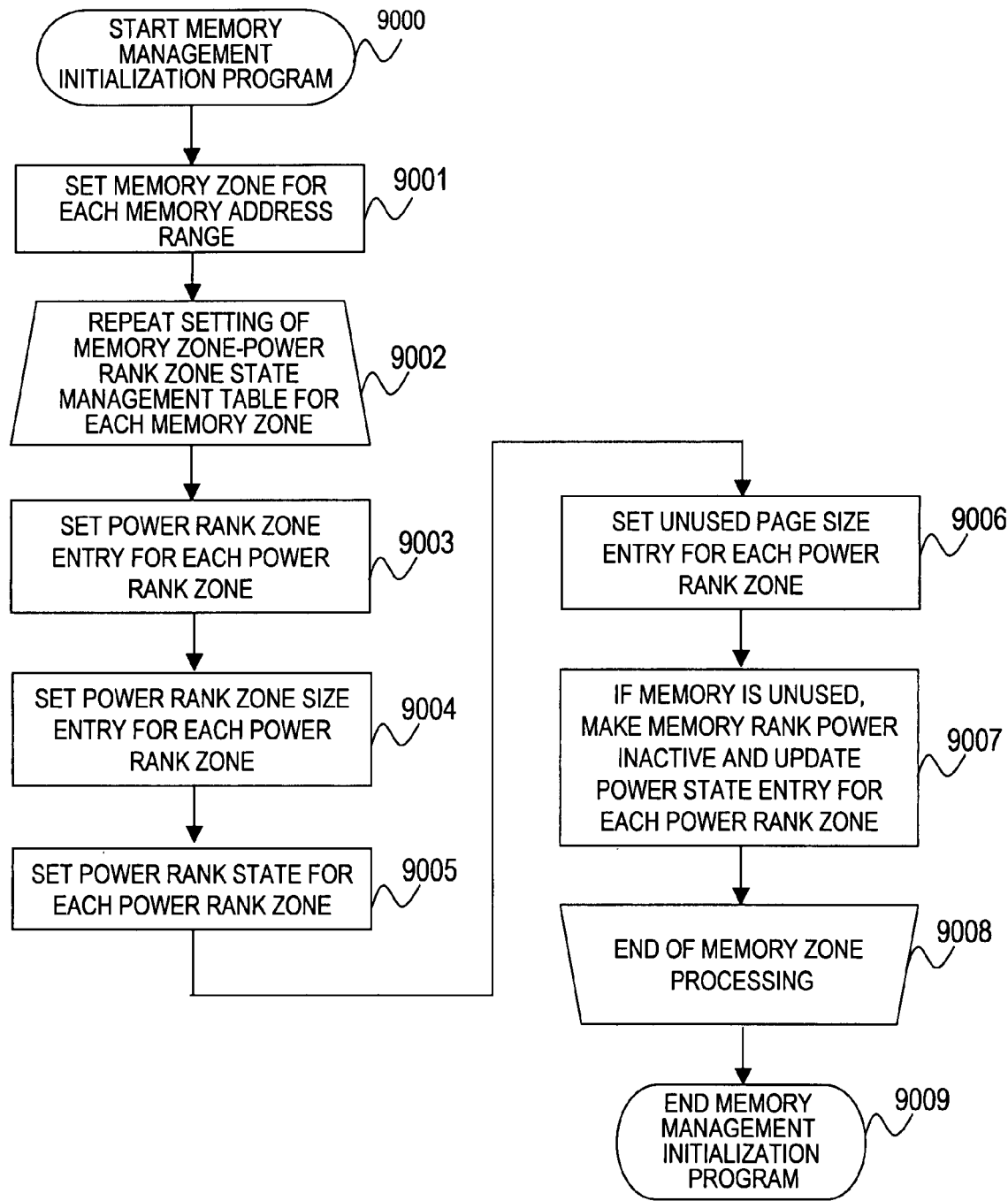
FIG. 9 is a flowchart of a memory management initialization program according to the first embodiment of the invention.

FIG. 9 is a flowchart of the memory management initialization program 2121 according to the first embodiment of the invention.

First, in case of which the basic system software 2120 is started, the memory management initialization program 2121 is executed by the CPU 1010 (9000).

The memory management initialization program 2121 registers the identifier of a memory zone in a memory zone 6000 for each memory address range registered in the memory address range 6010 in the memory zone-power rank zone state management table 2126 (9001).

For example, the memory zone 6000 is classified into DMA (Direct Memory Access) (16 MB), Normal (4 GB), and High (4 GB or more).

In the memory zone-power rank zone state management table 2126 shown in FIG. 6, Zone 0 corresponds to DMA, Zone 1 corresponds to Normal, and Zone 2 corresponds to High.

In case of which computing computers 1001 comprise a Numa system, the construction of the memory zone 6000 may be a memory zone divided among each of the computing computer 1001.

In case of which data of the structure of the memory 1030 and data of the structure of other hardware are required for the memory management initialization program 2121, for example, the hardware configuration table 2111 and the power rank zone-memory rank correspondence management table 2114 in the firmware 2110, are refers.

Next, the memory management initialization program 2121, for the memory zones 6060 to 6080 set by the processing of a step 9001, repeats the processing (processing of the step 9003 to step 9007) which initializes the memory zone-power rank zone state management table 2126 (9002).

The memory management initialization program 2121 sets each entry of the power rank zone 6020 included in the memory zone-power rank zone state management table 2126 referring to the power rank zone-memory rank correspondence management table 2114 (9003).

Specifically, the memory management initialization program 2121 extracts the memory address range registered in the address range 6010 corresponding to the memory zone 6000 set by the processing of the step 9001. The memory management initialization program 2121 then extracts an identifier registered in the power rank zone 4000 in a corresponding memory address range wherein the memory address 4100 in the power rank zone-memory rank management table 2114 is registered. The memory management initialization program 2121 then registers the extracted identifier of the power rank zone in a power rank zone 6020.

In case of which the power rank zone $PR_{xo}$, for example, spans the memory zone 0 and memory zone 1, i.e., in case of which the memory address area of the power rank zone $PR_{xo}$ is included in the both the area of the memory address of Zone 0 and the memory address of Zone 1, the memory management initialization program 2121 registers the identifier (6062, 6071) of the power rank zone $PR_{xo}$ in the power rank zone 6020 of the spanned, plural memory zones (Zone 0 and Zone 1).

The memory management initialization program 2121 also refers the power rank zone-memory rank correspondence management table 2114, and registers the value of the capacity of the power rank zone 4000 in the address range 6010 of the memory zone 6000, in a power rank size 6030 of the memory zone-power rank zone management table 2126 (9004).

For example, if the power rank zone $PR_{xo}$ spans Zone 0 and Zone 1, the memory management initialization program 2121 registers the size $RS_{x0-0}$ (6062) of the power rank zone $PR_{xo}$ of the memory address area included in the memory address area of Zone 0, in the power rank zone size 6030 of Zone 0.

The memory management initialization program 2121 also registers the size $RS_{x0-1}$ (6071) of the power rank zone $PR_{xo}$ of the memory address area included in the memory address area of Zone 1, in the power rank zone size 6030 of Zone 1.

Hence, in case of which the power rank zone spans plural memory zones, the memory management initialization program 2121 registers the value of the capacity included in the memory zones spanned by the power rank zone, in the power rank zone size 6030.

Next, the memory management initialization program 2121, in each power rank zone (6061 to 6062, 6071 to 6072, 6081 to 6082), registers the state of the power mode of each power rank zone, in the power state 6040 (9005).

For example, the memory management initialization program 2121 extracts the state of the power mode of each memory rank 1031 via the memory controller 1020. The memory management initialization program 2121 then registers the extracted state of the power mode in the power state 6040.

The memory management initialization program 2121 may register the state of the power mode of each memory rank 1031 in the power state 6040 by referring to the hardware configuration table 2111.

After the processing of step 9005, the memory management initialization program 2121 registers the number of memory page frames not used by each software in a number of unused memory page frame 6050 for each power rank zone (6061 to 6062, 6071 to 6072, 6081 to 6082), (9006).

In case of which the memory zone-power rank zone state management table 2126 has been initialized, the differential between the number of memory page frames in the power rank zone size 6030 of each power rank zone 6020 and the number of memory page frames of each power rank zone 6020 used to initialize the basic system software 2120 and used by codes and data, is registered in the number of unused memory page frame 6050 of each power rank zone.

After the processing of the step 9006, the memory management initialization program 2121 changes over the power mode state of all the memory ranks 1031 for which all the memory page frames included in the power rank zone 6020 are not used by each software, to an inactive state, and updates the power state 6040 (9007).

The change-over of the power mode of the memory rank 1031 is executed for example via the memory controller 1020.

In case of which the processing of the step 9007 is executed, the memory management initialization program 2121 repeats the processing of the step 9003 to step 9007 for the memory zones of all the identifiers registered in the memory zone 6000 (9008). After the processing of the step 9003 to step 9007 is repeated for the memory zones of all the identifiers registered in the memory zone 6000, the memory management initialization program 2121 is completed (9010).

Figure 10:
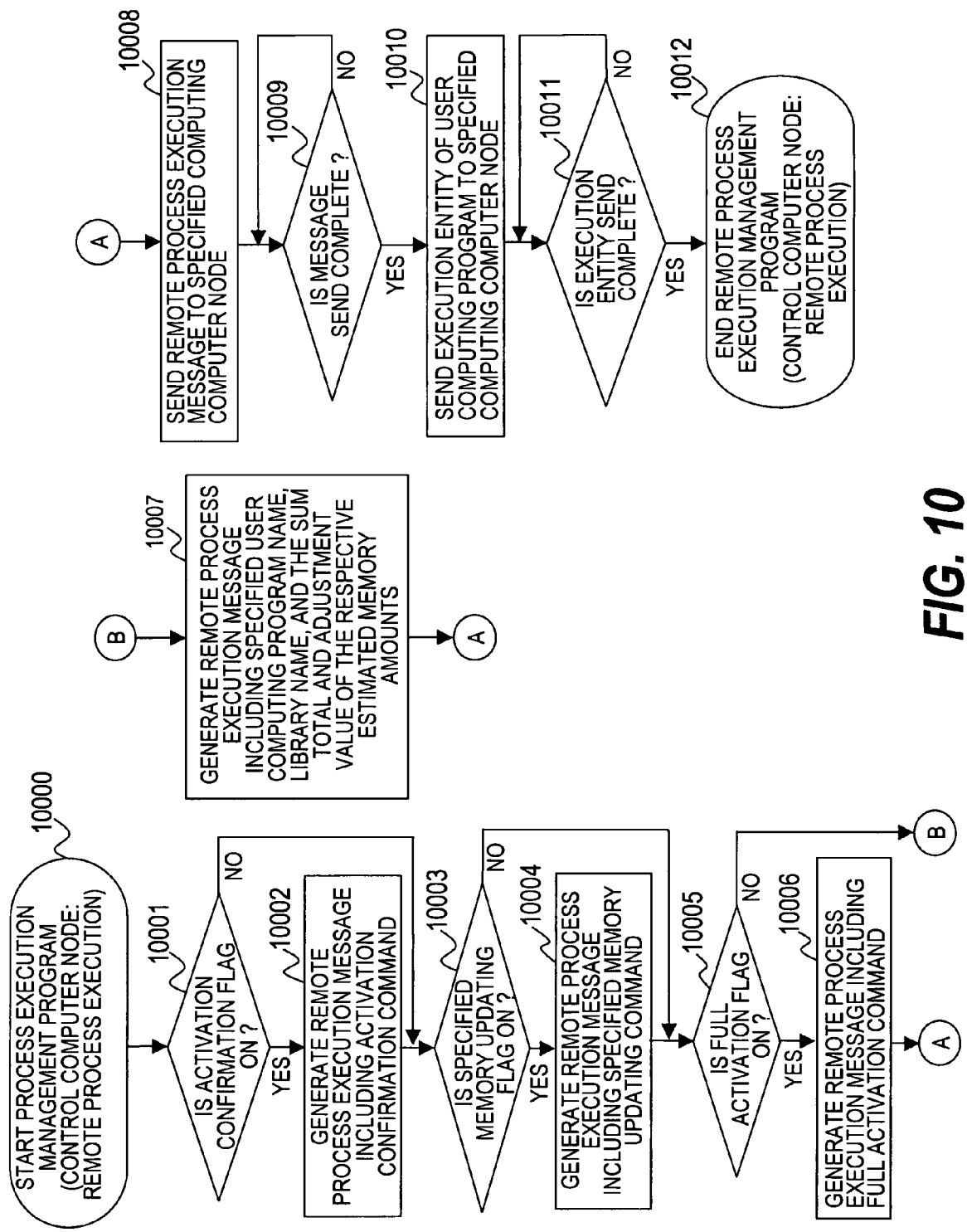
FIG. 10 is a flowchart of a processing executed by a remote process in a remote process execution control program stored by the control computer according to the first embodiment of the invention.

FIG. 10 is a flowchart of the processing which executes a remote process by the remote process execution control program 2041 stored by the control computer 1000 according to the first embodiment of the invention.

In case of which the remote process is executed by the computing computer 1001, processing which executes the remote process by the remote process execution control program 2041 is called and specified the computing computer 1001 which executes the remote process.

The computing computer 1001 whose node state 7010 in the computing computer node information table 2043 stored by the control computer 1000 is Running, is specified.

The computing computer 1001 for which the value of the capacity of the memory registered in the implemented memory 7030 in the computing computer node information table 2043, is larger than an estimate which is the sum of the sum values 8050 of each entry included in the remote process estimated memory amount table 2044, may also be specified.

First, the remote process execution control program 2041 determines whether ON is registered in the activity confirmation flag 8080 in the remote process estimated memory amount table 2044 (10001). In other words, the remote process execution control program 2041 determines whether or not the table is set for executing a remote process, after the capacity of the memory 1030 required to execute the remote process has been definitely activated.

In case of which it is determined that ON is registered in the activity confirmation flag 8080, the remote process execution control program 2041, after checking that the memory 1030 has been activated, generates a remote process execution message including an activity confirmation command which is a command for executing the remote process by the computing computer 1001 (10002), and proceeds to the processing of a step 10003.

In general, the control computer 1000 sends a remote process execution message to the computing computer 1001 which executes the remote process.

On the other hand, in case of which it is determined that ON is not registered in the activity confirmation flag 8080, the remote process execution control program 2041 proceeds to the processing of the step 10003.

Next, the remote process execution control program 2041 determines whether ON is registered in the updating flag 8090 by referring to the remote process estimated memory amount table 2044 (10003). Specifically, after the remote process is executed, the remote process execution control program 2041 determines whether or not the remote process estimated memory amount table 2044 is set for updating.

In case of which it is determined that ON is registered in the updating flag 8090, the remote process execution control program 2041, after the remote process is executed, generates a remote process execution message including an updating command which is a command to make the computing computer 1001 update the remote process estimated memory amount table 2044 (10004), and then proceeds to the processing of a step 10005.

On the other hand, when it is determined that ON is not registered in the updating flag 8090, the remote process execution control program 2041 proceeds to processing of the step 10005.

Next, the remote process execution control program 2041 determines whether or not ON is registered in the full activation flag 8070 by referring to the remote process estimated memory amount table 2044 (10005). In other words, the remote process execution control program 2041, in case of which the computing computer 1001 executes a remote process, determines whether the system is set to activate all the memory ranks 1031 with which the computing computer 1001 is provided. In case of which it is determined that ON is registered in the full activation flag 8070, the remote process execution control program 2041, when the computing computer 1001 executes a remote process, generates a remote process execution message containing a full activation command which is a command to make the computing computer 1001 activate the memory ranks 1031 including all the power rank zones with which the computing computer 1001 is provided (10006), and proceeds to the processing of a step 10008.

On the other hand, in case of which it is determined that ON is not registered in the full activation flag 8070, the remote process execution control program 2041 refers the remote process estimated memory amount table 2044 corresponding to the user computing program 2010 to be executed by the computing computer 1001, generates a remote process execution message including the user computing program 2010 and library 2020 registered in the program/library name 8000, a value registered in the sum value 8050 and a value registered in the adjustment value 8060 (10007), and proceeds to processing of a step 10008.

Next, the remote process execution control program 2041 sends the remote process execution message generated by the processing of the step 10002 to step 10007 to the specified computing computer 1001 (10008).

It is then determined whether or not sending of the remote process execution message by the remote process execution control program 2041 is complete (10009). Specifically, the remote process execution control program 2041 determines whether or not the control computer 1000 received a receive complete message sent by the processing of the step 11008 of FIG. 11.

In case of which it is determined that sending of the remote process execution message is complete, the remote process execution control program 2041 proceeds to the processing of the step 10010.

On the other hand, in case of which it is determined that sending of the remote process execution message is not complete, the routine returns to the processing of the step 10009.

In other words, the remote process execution management program 2041 cannot proceed to the processing of a step 10010 until sending of the remote process execution message is complete. In case of which it is determined that sending of the remote process execution message is complete, the remote process execution control program 2041 sends the content to be executed by the computing computer 1001 as a remote process to the specified computing computer 1001 (10010).

Here, the content executed as the user computing program 2010 by the computing computer 1001, includes the user computing program 2010 whose name is registered in the program library name 8000, the library 2020 whose name is registered in the program library name 8000, signal information, and a unique remote process identifier.

The remote process execution control program 2041 then determines whether or not sending of the content executed as a remote process, is complete (10011). In case of which it is determined that sending of the content executed as a remote process is complete, the remote process execution control program 2041 is completed (10012). On the other hand, in case of which it is determined that sending of the content executed as a remote process is not completed, the routine returns to the processing of the step 10011.

In other words, the remote process execution management process 2041 cannot proceed to the processing of a step 10012 until sending of the content executed as a remote process is complete.

Figure 11:
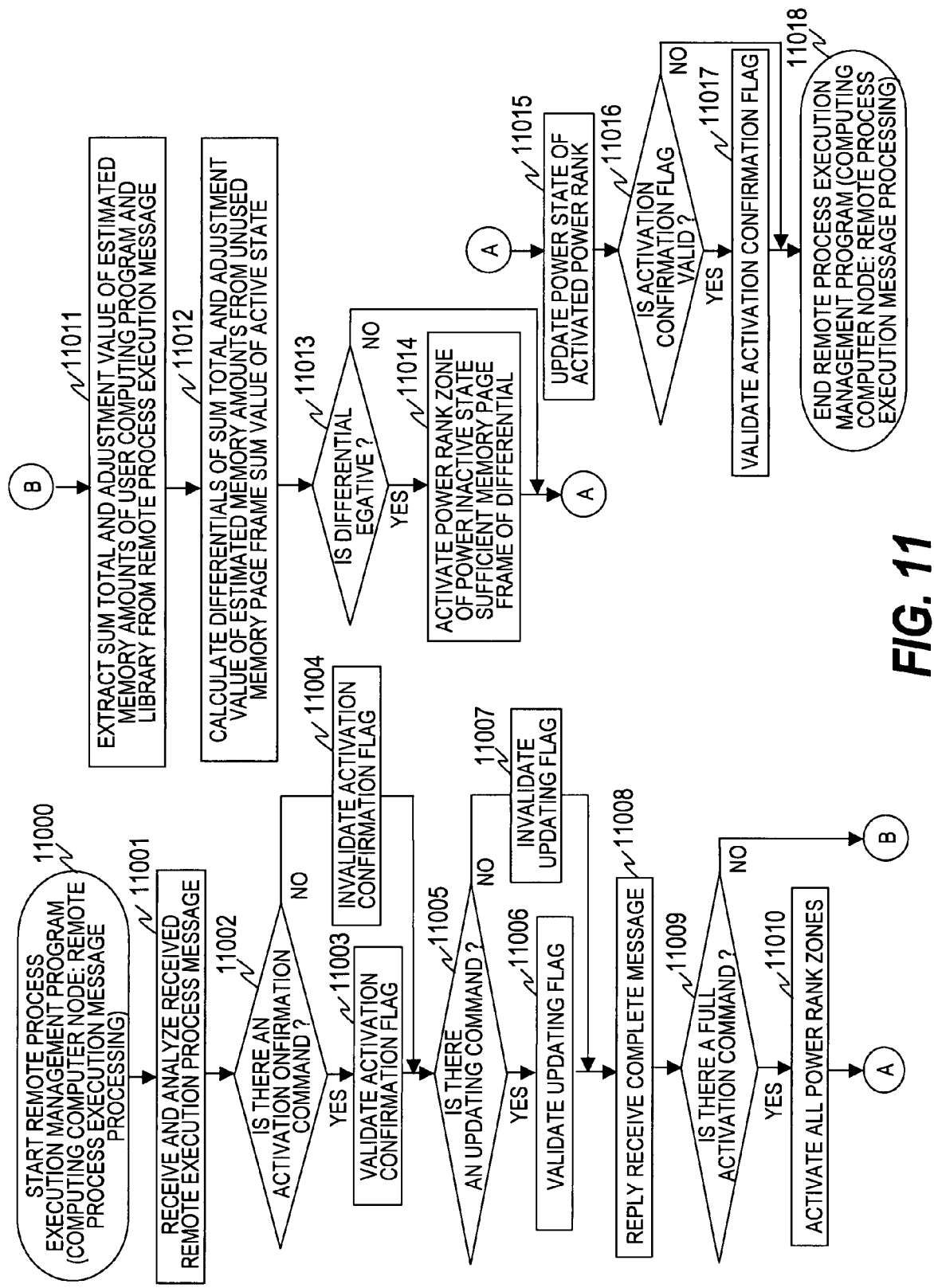
FIG. 11 is a flowchart of a remote process execution message processing in the remote process execution control program stored by the computing computer according to the first embodiment of the invention.

FIG. 11 is a flowchart of the remote process execution message processing by the remote process execution control program 2124 stored by the computing computer 1001 according to the first embodiment of the invention.

The remote process execution message processing in the remote process execution control program 2124 is called in case of which the computing computer 1001 receives a remote process execution message.

First, the remote process execution control program 2124 receives a remote process execution message, and analyzes the received remote process execution message (11001). The remote process execution control program 2124 then determines whether or not an activity confirmation command is included in the received remote process execution message (11002).

In case of which it is determined that an activity confirmation command is included in the received remote process execution message, the remote process execution control program 2124 validates an activity confirmation flag defined in the remote process execution control program 2124 (11003).

On the other hand, in case of which it is determined that an activity confirmation command is not included in the received remote process execution message, the remote process execution control program 2124 cancels the activity confirmation flag defined in the remote process execution control program 2124 (11004).

Next, the remote process execution control program 2124 determines whether or not an updating command is included in the received remote process execution message (11005). In case of which it is determined that an updating command is included in the received remote process execution message, the remote process execution control program 2124 validates the updating flag defined by the remote process execution control program 2124 (11006).

On the other hand, in case of which it is determined that an updating command is not included in the received remote process execution message, the remote process execution control program 2124 cancels the updating flag defined in the remote process execution control program 2124 (11007).

Next, the remote process execution control program 2124 sends a message showing that receipt of the remote process execution message is complete, to the control computer 1000 (11008). The remote process execution control program 2124 then determines whether or not a full activation command is included in the received remote process execution message (11009).

In case of which it is determined that a full activation command is included in the received remote process execution message, the remote process execution control program 2124 activates all the memory ranks 1031 including all the power rank zones with which the computing computer 1001 is provided (11010).

On the other hand, in case of which it is determined that a full activation command is not included in the received remote process execution message, the remote process execution control program 2124 extracts a value registered in a sum value 8040 of the user computing program 2010 and library 2020 included in the received remote process execution message, and a value registered in the adjustment value 8050 (11011).

The remote process execution control program 2124 then refers the memory zone-power rank zone state management table 2126, and computes an unused memory page frame capacity based on a value registered in the number of unused memory page frame 6050 of the entry for which the value registered in the power state 6040, is the active state. Since the capacity of the memory page frame is set beforehand, the unused memory page frame capacity is computed by multiplying this preset capacity by the value registered in the number of unused memory page frame 6050.

The remote process execution control program 2124 then computes an estimate which is the sum of the values registered in each sum value 8040 acquired by the processing of the step 11011. Next, the remote process execution control program 2124 calculates the differential between the computed unused memory page frame capacity, and the sum of the estimate and the values registered in the adjustment value 8050 (11012). The remote process execution control program 2124 then determines whether or not the differential calculated by the processing of the step 11012 is negative (11013).

In case of which it is determined that the differential calculated by the processing of the step 11012 is negative, the remote process execution control program 2124 changes over the power mode of the memory rank 1031 which is an inactive state, to the active state, so that the capacity of unused memory page frames including the power rank zone for which the power mode was newly changed to the active state, becomes the differential calculated by the processing of the step 11012 (11014).

Specifically, the remote process execution control program 2124 changes over the power mode of the memory rank 1031 including the power rank zone concerned from an inactive state to an active state, in an order starting from a preset memory zone giving priority to power rank zones for which the value registered in the power rank zone size 6030 is small.

In general, in case of allocating the memory 1030 to execute a user program (e.g., the user computing program 2010), the priority order of searched memory zones is specified beforehand by the memory management program 2122. Therefore, the remote process execution control program 2124 should change over the power mode of the memory rank 2124 belonging to the power rank zone of a memory zone, with the memory zone priority order specified by the memory management program 2122.

Next, the remote process execution control program 2124 updates the power state 6040 of the entry corresponding to the power rank zone newly changed to the active state, in the memory zone-power rank zone state management table 2126 (11015).

The remote process execution control program 2124 then determines whether or not the activity confirmation flag defined by the remote process execution control program 2124 is validated (11016).

When it is determined that the activity confirmation flag defined by the remote process execution control program 2124 is validated, the remote process execution control program 2124 validates an activity completion flag defined by the remote process execution control program 2124 (11017), and the remote process execution control program 2124 is completed (11018).

On the other hand, in case of which it is determined that the activity confirmation flag defined by the remote process execution control program 2124 is validated, the remote process execution control program 2124 is completed (11018).

In case of which remote execution process is received, the remote process execution control program 2124 activates the capacity of the memory 1030 required to execute the remote process first. Also, the control computer 1000 does not send the content executed as a remote process to the computing computer 1001 until it receives a receive complete message.

Due to this, since the memory 1030 is activated first before the remote process is loaded into the memory 1030, the power consumed by the memory 1030 can be reduced without affecting the processing speed by which the computing computer 1001 executes the remote process.

Figure 12:
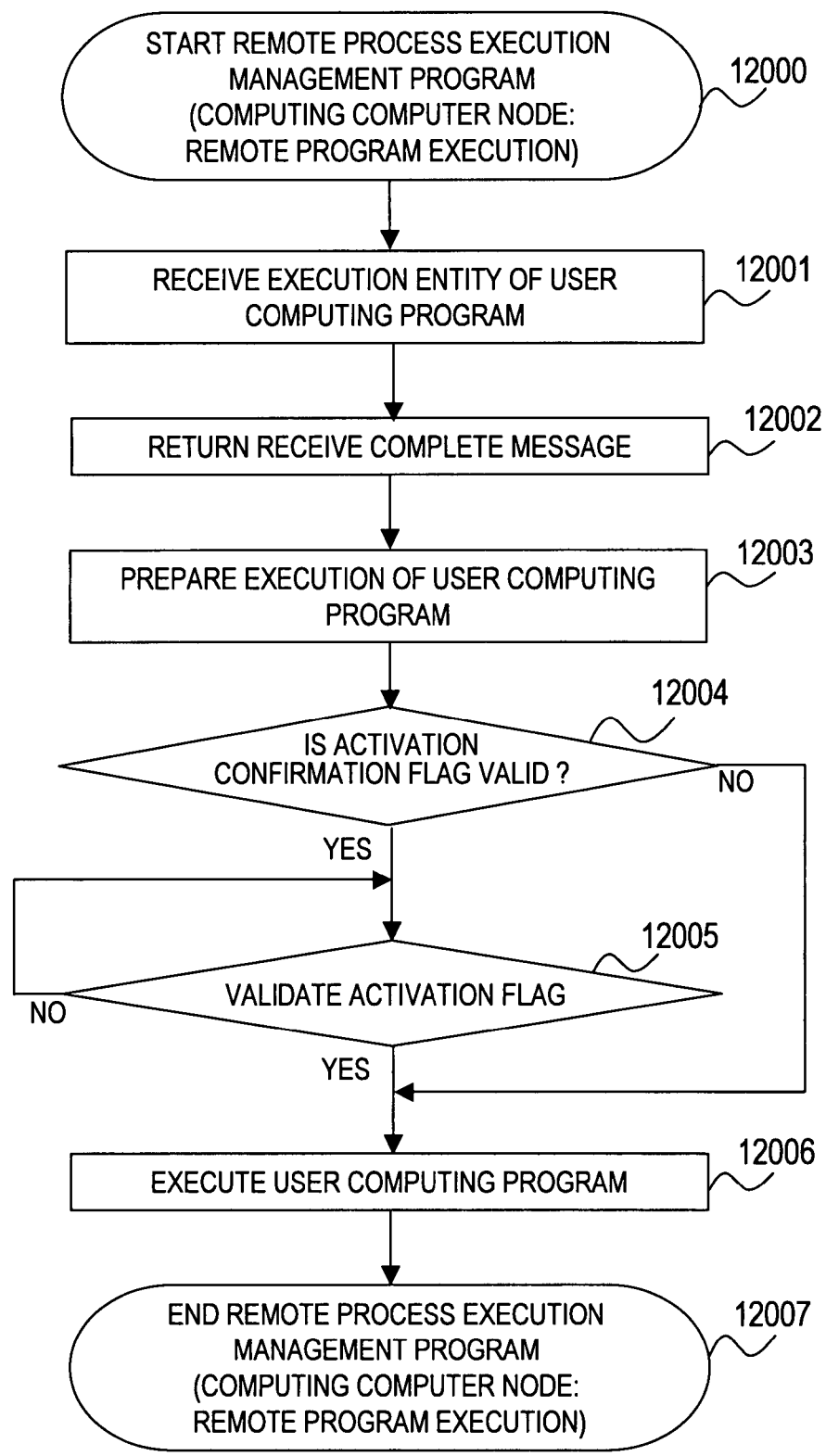
FIG. 12 is a flowchart of a remote program execution processing in the remote process execution control program stored by the computing computer according to the first embodiment of the invention.

FIG. 12 is a flowchart of the remote program execution processing by the remote process execution control program 2124 stored by the computing computer 1001 according to the first embodiment of the invention.

The remote program execution processing by the remote process execution control program 2124, is called in case of which the computing computer 1001 receives the content to be executed as a remote process by the computing computer 1001 sent from the control computer 1000 by the processing of the step 10010.

First, the remote process execution control program 2124 receives the content to be executed by the computing computer 1001 as a remote process (12001).

The remote process execution control program 2124 sends a message showing that receipt of the content to be executed by the computing computer 1001 as a remote process is complete, to the control computer 1000 (12002).

Next, the remote process execution control program 2124 prepares to execute the user computing program 2010 (12003). Specifically, the remote process execution control program 2124 reserves the capacity of the memory 1030 required to execute the user computing program 2010 and the library 2020 which are the content to be executed as the received remote process. The remote process execution control program 2124 also sets a signal information and process number, etc. which were received.

The remote process execution control program 2124 then determines whether or not an activity confirmation flag set by the processing of the step 11003, is validated (12004).

In case of which it is determined that the activity confirmation flag is validated, the remote process execution control program 2124 determines whether or not the activity completion flag set by the processing of the step 11017 is validated (12005).

In case of which it is determined that the activity completion flag is validated by the processing of the step 12005, and in case of which it is determined that the activity confirmation flag is not validated by the processing of the step 12004, the remote process execution control program 2124 executes the user computing program 2010 (12006) and the remote process execution control program 2124 is completed (12007).

In case of which it is determined that the activity completion flag is not validated by the processing of the step 12005, the remote process execution control program 2124 waits for the activity completion flag to be validated, and executes the user computing program 2010 after the activity completion flag is validated.

Figure 13:
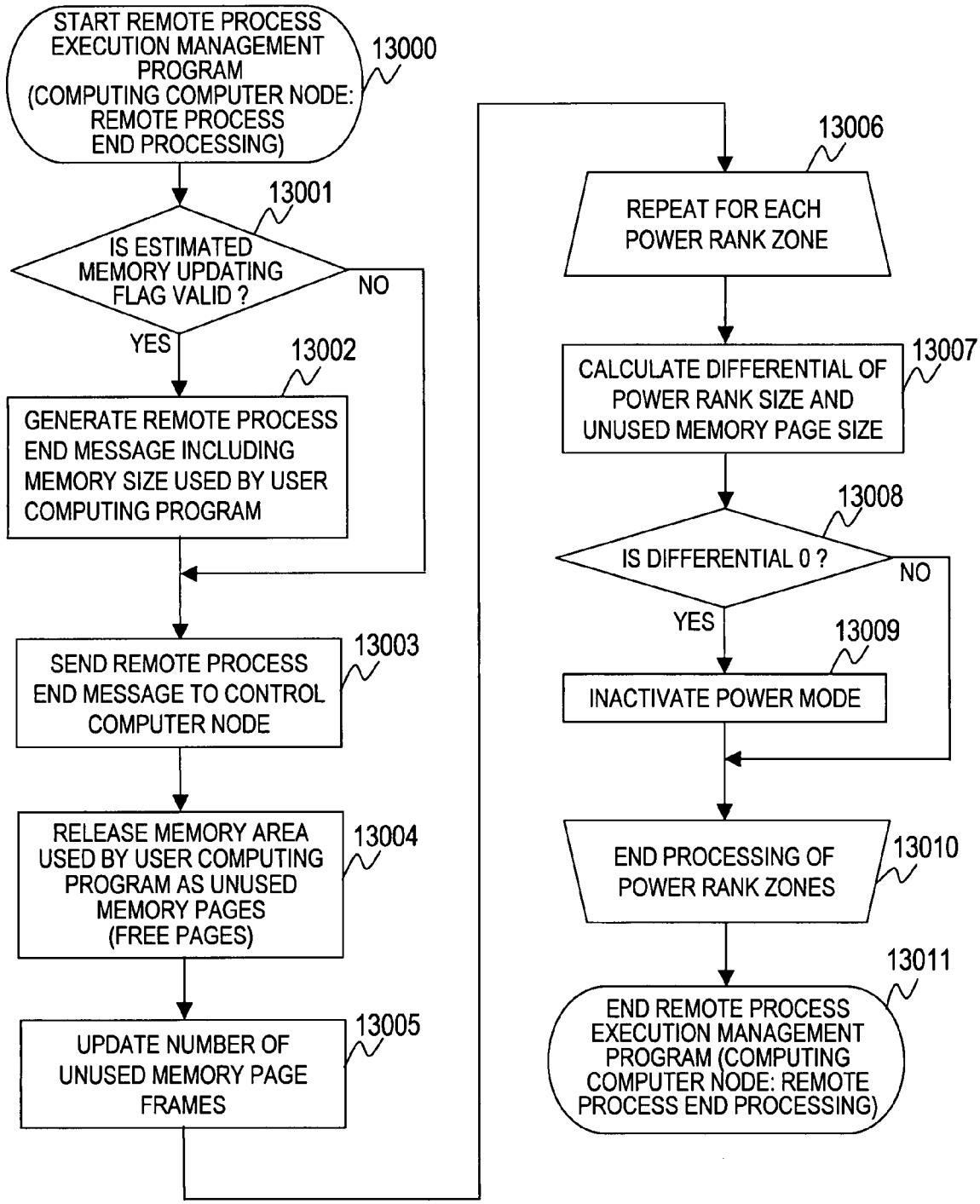
FIG. 13 is a flowchart of a remote process completion processing in the remote process execution control program stored by the computing computer according to the first embodiment of the invention.

FIG. 13 is a flowchart of the remote process completion processing in the remote process execution control program 2124 stored by the computing computer 1001 according to the first embodiment of the invention.

The remote process completion processing in the remote process execution control program 2124 is the processing of the step 12006, and is called when execution (12006) of the user computing program 2010 is complete.

First, the remote process execution control program 2124 determines whether or not the updating flag defined by the remote process execution control program 2124 is validated (13001).

In case of which it is determined that the updating flag is validated, the remote process execution control program 2124 generates a remote process completion message showing that execution of the remote process including the value of the capacity of the used memory 1030 is complete while executing the user computing program 2010, (13002), and proceeds to the processing of a step 13003.

In general, the capacity of the memory 1030 used by the user computing program 2010 is managed by the memory management program 2122. Therefore, the remote process execution control program 2124 extracts the capacity of the memory 1030 used by the user computing program 2010 by referring to the memory management program 2122.

On the other hand, in case of which it is determined that the updating flag is validated, the remote process execution control program 2124 generates a remote process completion message showing that execution of the remote process has completed, and proceeds to the processing of the step 13003.

Next, the remote process execution control program 2124 sends a remote process completion message to the control computer 1000 (13003).

The remote process execution control program 2124 releases the area of the memory 1030 used by the user computing program 2010 as an unused memory page frame (13004).

The remote process execution control program 2124 updates the value registered in the number of unused memory page frame 6050 included in the memory zone-power rank zone state management table 2126 (13005).

For the processing which releases the memory page frame used by the user computing program 2010, the memory management program 2122 may be called, and the processing executed also by the called memory management program 2122.

Also, for processing which updates the value registered in the unused memory page frame number 6050 in the memory zone-power rank zone state management table 2126, the memory power management program 2123 or the memory management program 2122 may be called, and the processing executed by the called memory power management program 2123 or the memory management program 2122 based on information relating to unused memory page frames managed by the memory management program 2122.

Next, the remote process execution control program 2124 repeats the processing of the steps 13007 to 13009 for the power rank zone of the identifier registered in each power rank zone 6020 in the memory zone-power rank zone state management table 2126 (13006).

First, the remote process execution control program 2124 multiplies the value registered in the unused memory page frame number 6050, by the capacity per memory page frame. The capacity of unused memory page frames is thereby calculated. The remote process execution control program 2124 then calculates the differential between the value registered in the power rank zone size 6030, and the calculated capacity of unused memory page frames (13007).

The remote process execution control program 2124 then determines whether or not the differential calculated by the processing of the step 13007 is 0 (13008).

In case of which the differential is determined to be 0, the power mode of the memory rank 1031 including the corresponding power rank zone 6020 is put into an inactive state (13009).

On the other hand, after the processing of step 13009 was executed, or in case of which it is determined that the differential calculated by the processing of the step 13008 is not 0, the processing of the steps 13007 to 13009 is executed for the power rank zones of all the identifiers registered in each power rank zone 6020 in the memory zone-power rank zone state management table 2126 (13010), and the remote process execution control program 2124 is completed (13011).

Figure 14:
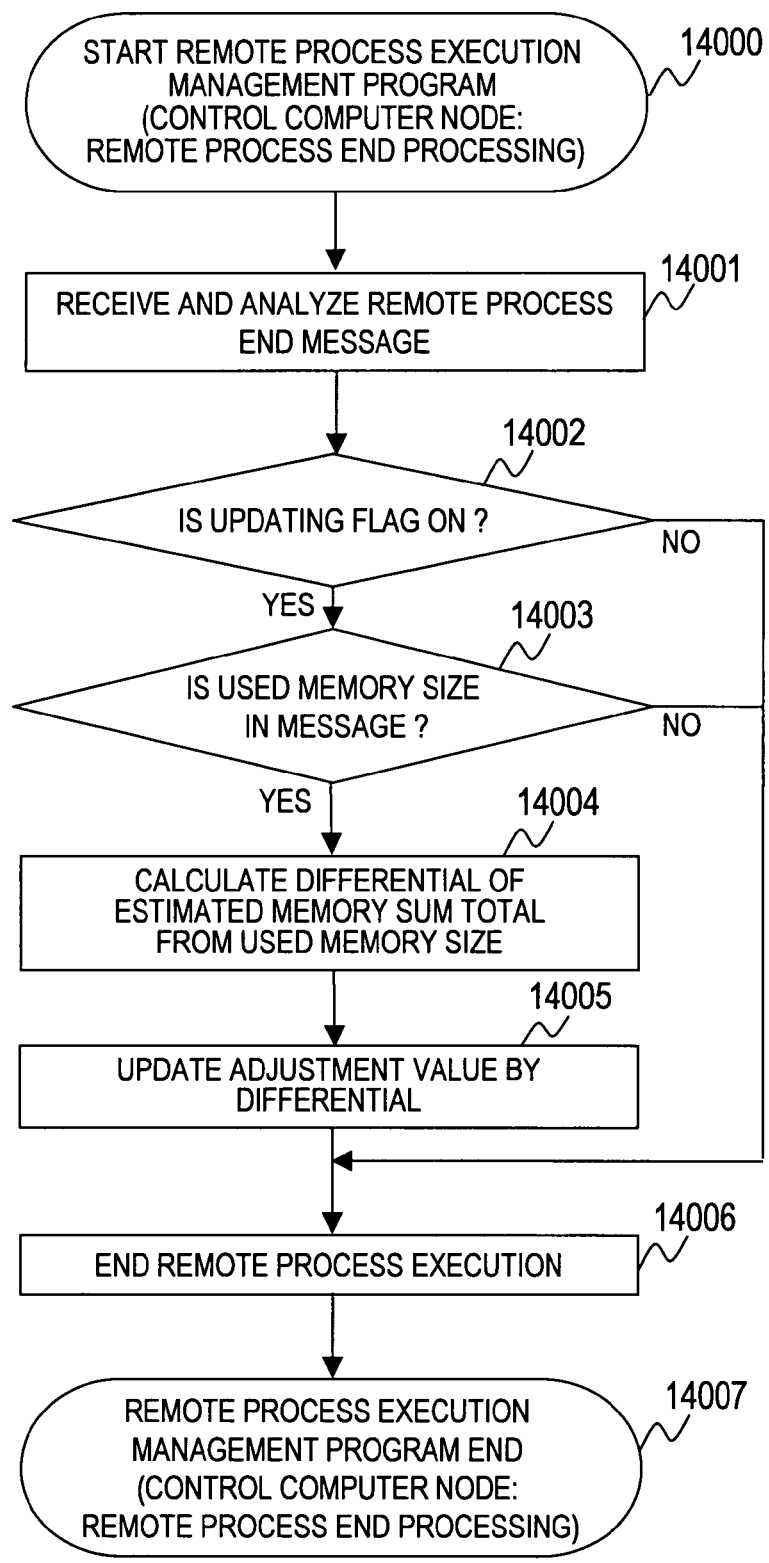
FIG. 14 is a flowchart of the remote process completion processing in the remote process execution control program stored by the control computer according to the first embodiment of the invention.

FIG. 14 is a flowchart of the remote process completion processing in the remote process execution control program 2041 stored by the control computer 1000 according to the first embodiment of the invention.

In case of which the control computer 1000 receives a remote process completion message sent from the computing computer 1001, the remote process completion processing in the remote process execution control program 2041, is called.

First, the remote process execution control program 2041 receives a remote process completion message, and analyzes the received remote process completion message (14001).

The remote process execution control program 2041 then determines whether or not ON is registered in the updating flag 8090 included in the remote process estimated memory amount table 2044 corresponding to the remote process which the computing computer 1001 was made execute (14002).

In case of which it is determined that ON is not registered in the updating flag 8090, the routine proceeds to the processing of a step 14006.

In case of which it is determined that ON is registered in the updating flag 8090, the remote process execution control program 2041 determines whether or not the value of the capacity of the memory 1030 actually used for the remote process completion message by the user computing program 2010 is included (14003).

In case of which it is determined that the value of the capacity of the memory 1030 actually used by the user computing program 2010 is included, the remote process execution control program 2041 calculates a differential between the capacity of the memory 1030 included in the remote process completion message and an estimate which is the sum of the sum values 8050 of the entries in the remote process estimated memory amount table 2044 (14004).

On the other hand, in case of which it is determined that the value of the capacity of the memory 1030 actually used for the remote process completion message by the user computing program 2010 is not included, the routine proceeds to the processing of the step 14006.

After the processing of the step 14004 is executed, the remote process execution control program 2041 registers the differential calculated by the processing of the step 14004 in the adjustment value 8060 included in the remote process estimated memory amount table 2044 (14005).

Next, the remote process execution control program 2041 completes remote process execution processing on the user computing program 2010 (14006), and completes the remote program-execution management program 2041 (14007).

In the first embodiment, a parallel computing system comprising plural computers (the control computer 1000 and the computing computer 1001) which are interconnected with each other, is combined with basic system software (2040 and 2120) (OS, etc.), and the power consumed by the memory 1030 is reduced. Power mode control of the memory 1030, and allocation and release of the memory 1030, are then executed sequentially taking account of the fact that the user computation program 2010 is executed by the computing computer 1001 as a remote process.

Due to this, in case of which the user computation program 2010 is executed as a remote process, the power mode having the absolute minimum required memory rank 1031 can be changed over to the active state. Also, fragmentation where the area used by the memory 1030 spans the memory rank 1031 can be prevented.

Therefore, the power consumed by the memory 1030 can be reliably and efficiently reduced to a large extent. Further, since the power mode of the memory rank 1031 required for the computing computer 1001 to execute a remote process is activated first, latency generated in case of which the power mode of the memory rank 1031 is changed over can be concealed. Therefore, the power consumed by the memory 1031 can be reduced without affecting the performance whereby the CPU 1010 accesses the memory 1031.

Also, in case of which the user computing program 2010 is executed by the computing computer 1001, external disturbance can be eliminated.

In particular, in case of which the user computing program 2010 uses a large amount of the memory 1030 (e.g., a scientific or technical calculation program), the power consumed by the memory 1030 can be more efficiently reduced.

Second embodiment

A second embodiment of the invention will now be described referring to FIGS. 15 to 18.

The second embodiment is an embodiment wherein, in case of which the capacity of the memory 1030 required for the computing computer 1001 to execute a remote process is activated first, the user can specify the method of activation of the power rank zones to be activated first.

Hereafter, only those parts of the second embodiment which are different from the first embodiment will be described.

The same numerals are assigned to the same structures as in the first embodiment.

Figure 15:
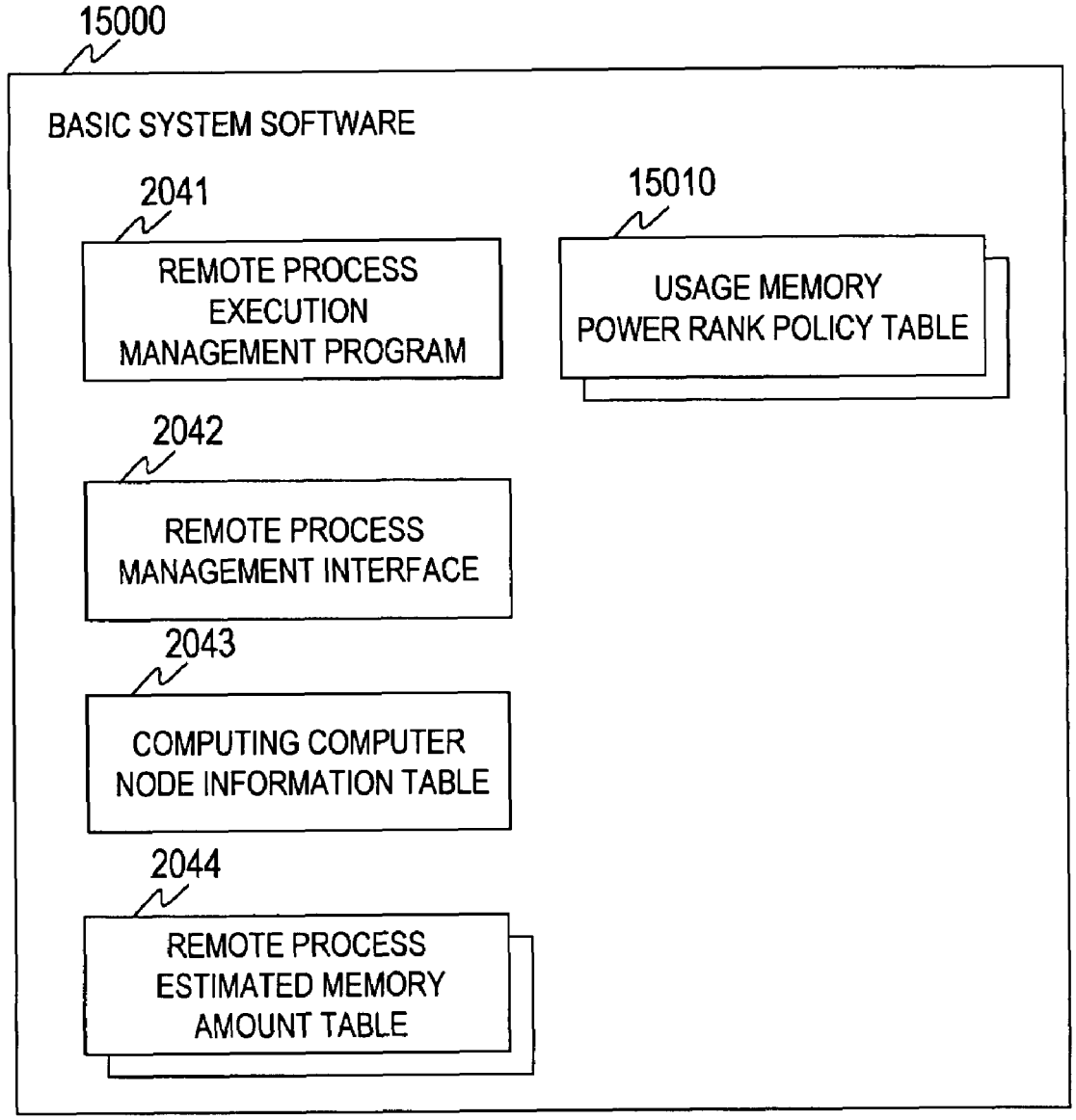
FIG. 15 is a drawing showing the structure of a basic system software stored by a control computer 1000 according to a second embodiment of the invention.

FIG. 15 is a drawing showing the structure of the basic system software 15000 stored in the control computer 1000 according to the second embodiment of the invention.

A basic system software 15000 is executed by the CPU 1010 with which the control computer node 1000 is provided.

The basic system software 15000 includes a used memory power rank policy table 15010.

The used memory power rank policy table 15010 shows the policy of the power rank zone to be activated first, in case of which the capacity of the memory 1030 required for the computing computer 1001 to execute a remote process is activated first. The remaining construction of the basic system software 15000 is identical to that of the first embodiment.

FIG. 16 is a drawing showing the structure of the used memory power rank policy table 15010 according to the second embodiment of the invention.

The used memory power rank policy table 15010 is managed by the basic system software 15000.

The used memory power rank policy table 15010 includes a program name 16000, priority allocation power rank zone number 16010, power rank zone priority order 16020, memory allocation policy 16030, and power rank zone assignment flag 16040.

The name of the user computing program 2010 is registered in the program name 16000.

In case of using the capacity of the memory 1030 required for the computing computer 1001 to execute a remote process, the number of the power rank zones given priority is registered in the priority allocation power rank zone number 16010.

In case of using the capacity of the memory 1030 required for the computing computer 1001 to execute a remote process, an identifier of the power rank zone in the power rank zone priority order is registered in the power rank zone priority order 16020.

In case of which the power rank zone of the identifier registered in the power rank zone priority order 16020 cannot be used, a policy showing the power rank zone activated with priority is registered in the memory allocation policy 16030. In case of which the power rank zones of all the identifiers registered in the power rank zone priority order 16020 may be used, for example, the power rank zone of the identifier registered in the power rank zone priority order 16020 cannot be used.

In case of which the capacity of the memory 1030 required for the computing computer 1001 to execute a remote process is allocated, a value showing whether or not to activate a power rank zone with priority is registered based on the value registered in the priority allocation power rank zone number 16010, the power rank zone priority order 16020, and the memory allocation policy 16030. In the power rank zone assignment flag 16040, plural used memory power rank policy tables 15010 may be stored in the control computer 1000 for each computing computer 1001 whose names are registered in the computing computer node 7000 in the computing computer node information table 2043.

For example, in the used memory power rank policy table 15010 shown in FIG. 16, the number of power rank zones used by Prog 0 (16050) having priority is 5. Also, the power rank zones used with priority are in the order $PR_{xp}$, $PR_{xp+1}$, $PR_{xp+2}$, $PR_{xp+3}$, and $PR_{xp+4}$. If any of $PP_{xp}$, $PR_{xp+1}$, $PR_{xp+2}$, $PR_{xp+3}$, $PR_{xp+4}$ are not assigned by the user computing program 2010, which they are already in use, priority is given in an ascending order from the power zone $PR_{xp+5}$.

Also, the power rank zone assignment flag is validated. Therefore, in case of which the capacity of the memory 1030 required for the computing computer 1001 to execute a remote process is used, the power rank zones are used with a priority based on the values registered in the priority allocation power rank zone number 16010, power rank zone priority order 16020, and memory allocation policy 16030.

The name of the user computing program 2010 executed by the computing computer 1001 as a remote process is registered in the program name 16000. The number of the names of the user computing programs 2010 registered in the program name 16000 may be singular, or plural.

A value which is an integer equal to 0 or more is registered in the priority allocation power rank zone number 16010. The value registered in the priority allocation power rank zone number 16010 does not exceed the number of power rank zones of the memory 1030 with which the computing computer node 1001 is provided. This can be prevented by looking up the number of entries registered in the power rank zone 6020 in the memory zone-power rank zone state management table 2126, in case of which the user sets the priority allocation power rank zone number 16010.

The user may also set the value registered in the priority allocation power rank zone number 16010 so that the unused memory page frame capacity of a power rank zone whose value is registered in the priority allocation power rank zone number 16010, is equal to or greater than the value registered in the sum value 8050 and the adjustment value 8060 in the remote process estimated memory amount table 2044.

The power rank zone priority order 16020 sets a power rank zone priority equal to the priority allocation power rank zone number 16010. The memory allocation policy 16030 is set so that, in case of which execution of a certain user computing program is complete, all the memory page frames including a power rank zone constitute an unused area as far as possible. If the entries (16010, 16020, 16030) are not set, the remote process execution control program 2124 sets each entry appropriately.

In case of which the user computing program 2010 is executed by the computing computer 1001 as a remote process, the memory management program 2122 stored in the computing computer 1001 is executed by a memory allocation based on the value registered in the power rank zone priority order 16020 and the memory allocation policy 16030.

A default value is normally registered in each entry of the used memory power rank policy table 15010. The user can also set the used memory power rank policy table 15010.

Specifically, the user may generate the used memory power rank policy table 15010, add entries to be registered in the used memory power rank policy table 15010, or change the values registered in the used memory power rank policy table 15010 via the remote process control interface 2042 using an input device with which the control computer 1000 is provided.

The user may also set the used memory power rank policy table 15010 via the remote process control interface 2042, through a network 1210 from the computer 1220 in a remote location.

The remote process execution control program 2124 stored in the computing computer 1001 may also set the used memory power rank policy table 15010 via the remote process control interface 2042 stored in the control computer 1000, through the network 1190 or the high-speed I/O device 1140.

For example, the remote process execution control program 2124 determines the value registered in the priority allocation power rank zone number 16010, the identifier of the power rank zone registered in the power rank zone priority order 16020, and the policy registered in the memory allocation policy 16030.

The value registered in the priority allocation power rank zone number 16010, the identifier of the power rank zone registered in the power rank zone priority order 16020, and the policy registered in the memory allocation policy 16030 may also be registered in the used memory power rank policy table 15010 "as is".

Figure 17:
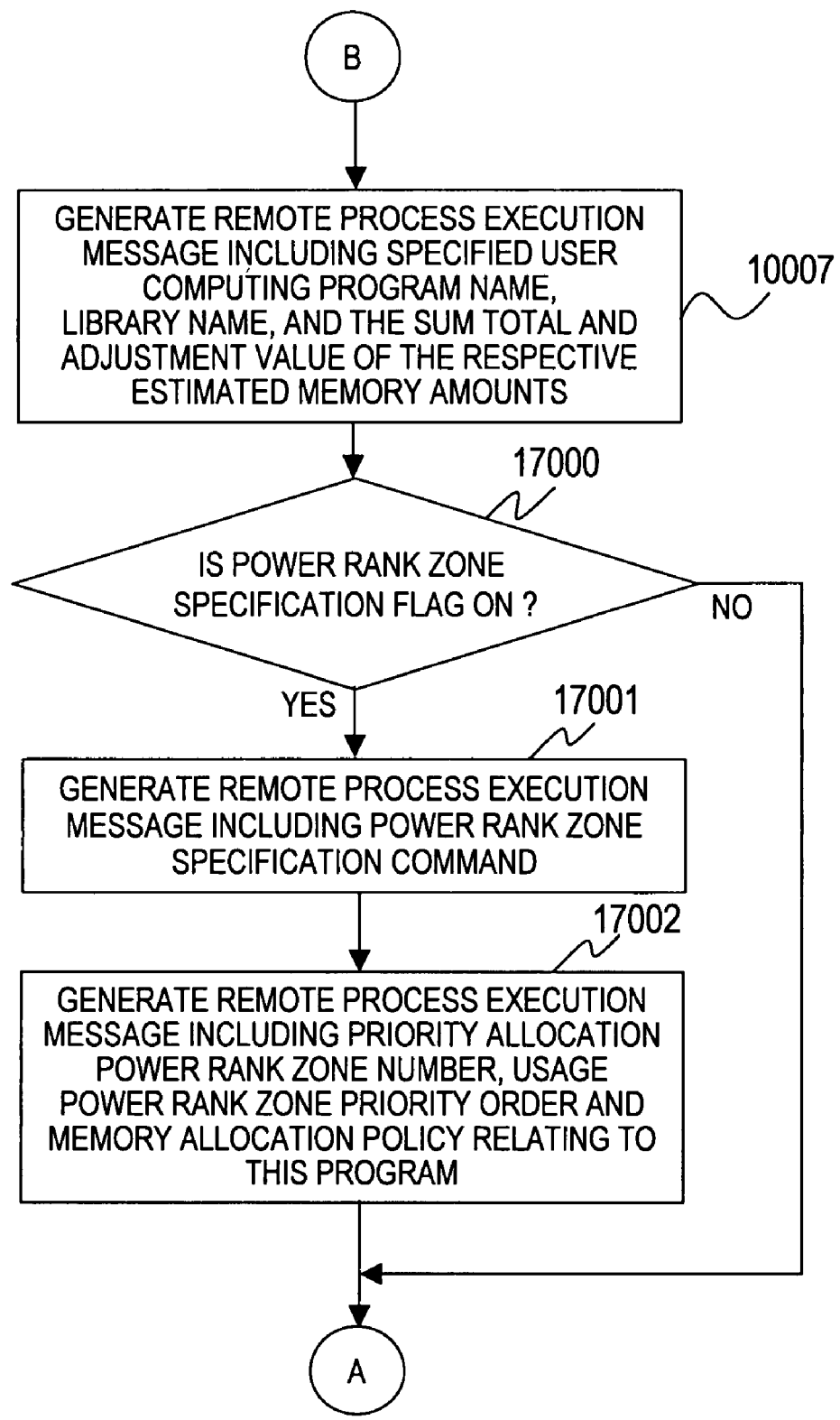
FIG. 17 is a flowchart of a remote process execution processing in a remote process execution control program stored by a control computer according to the second embodiment of the invention.

FIG. 17 is a flowchart of the remote process execution processing in the remote process execution control program 2041 stored in the control computer 1000 according to the second embodiment of the invention.

Those parts of the remote process execution processing which are different from the remote process execution control program 2041 of the first embodiment shown in FIG. 10, will be described.

In the processing of a step 10005, the remote process execution control program 2041, in case of which it is determined that ON is not registered in all full activation flag 8070, proceeds to the processing of the step 10007.

The remote process execution control program 2041, after executing the processing of the step 10007, then determines whether or not ON is registered in the power rank zone assignment flag 16040 by referring to the used memory power rank policy table 15010 (17000).

In case of which ON is not registered in the power rank zone assignment flag 16040, the remote process execution control program 2041 proceeds to the processing of a step 10008.

On the other hand, in case of which ON is registered in the power rank zone assignment flag 16040, the remote process execution control program 2041 generates a process execution message including a power rank zone assignment command, which is a command giving priority to activating the power rank zones specified by the used memory power rank policy table 15010 (17001).

The remote process execution control program 2041 then selects an entry which coincides with the name of the user computing program 2010 which the computing computer 1001 is made to execute as a remote process from among the names of the user computing programs registered in the program name 16000 in the used memory power rank policy table 15010. The values registered in the priority allocation power rank zone number 16010, power rank zone priority order 16020, and memory allocation policy 16030 are extracted from the selected entry, a remote execution message including the acquired values is generated (17002), and the routine proceeds to the processing of the step 10008.

Figure 18:
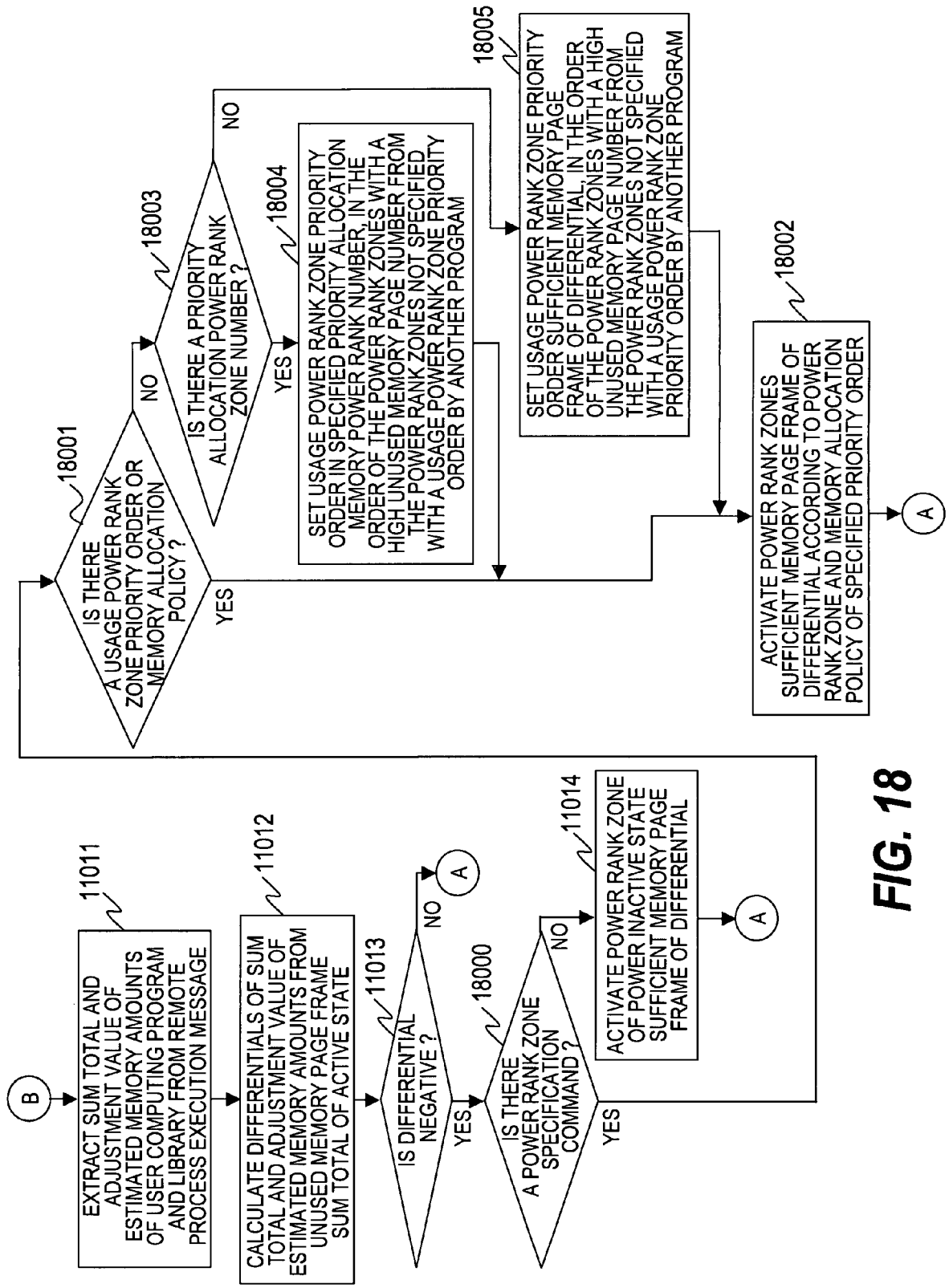
FIG. 18 is a flowchart of the remote process execution message processing in the remote process execution control program stored by the computing computer according to the second embodiment of the invention.

FIG. 18 is a flowchart of the remote process execution message processing in the remote process execution control program 2124 stored in the computing computer 1001 according to the second embodiment of the invention.

Only those parts different from the remote process execution message processing in the remote process execution control program 2124 of the computing computer node software 2100 of the first embodiment shown in FIG. 11, will be described.

In case of which it is determined that a full activation command is not included in the received remote process execution message, the remote process execution control program 2124 executes the processing of the step 11011 to step 11013.

In case of which it is determined by the processing of the step 11013 that the differential is not negative, the routine proceeds to the processing of the step 11015.

On the other hand, in case of which it is determined by the processing of the step 11013 that the differential is negative, the remote process execution control program 2124 determines whether or not a power rank zone assignment command is included in the received remote process execution message (18000).

In case of which it is determined that a power rank zone assignment command is included in the received remote process execution message, the routine proceeds to the processing of a step 18001.

In case of which it is determined that a power rank zone assignment command is not included in the received remote process execution message, the remote process execution control program 2124 executes the processing of the step 11014, and the routine proceeds to the processing of the step 11015.

In case of which it is determined that a power rank zone assignment command is included in the received remote process execution message, the remote process execution control program 2124 determines whether or not at least one of the value registered in the power rank zone priority order 16020 and the value registered in the memory allocation policy 16030 is included in the received remote process execution message (18001).

In case of which it is determined that neither the value registered in the power rank zone priority order 16020 nor the value registered in the memory allocation policy 16030 is included in the received remote process execution message, the remote process execution control program 2124 determines whether or not the value registered in the priority allocation power rank zone number 16010 is included in the received remote process execution message (18003).

In case of which it is determined that the value registered in the priority allocation power rank zone number 16010 is included in the received remote process execution message, the remote process execution control program 2124 assigns a priority order to the power zones in increasing order of the values registered in the unused memory page frame number 6040 of the corresponding power rank zone, from power rank zones other than the identifier registered in the power rank zone priority order 16020 corresponding to other user computing programs 2010 executed by the computing computer 1001 (18004).

The number of power rank zones to which priority is assigned, is identical to the value registered in the priority allocation power rank zone number 16010.

After the processing of the step 18004 is executed, the routine proceeds to the processing of the step 18002.

On the other hand, in case of which it is determined that the value registered in the priority allocation power rank zone number 16010 is not included in the remote process execution message received in the processing of the step 18003, the remote process execution control program 2124 assigns a priority order to the power zones in increasing order of the values registered in the unused memory page frame number 6040 of the corresponding power rank zone, from power rank zones other than the identifier registered in the power rank zone priority order 16020 corresponding to other user computing programs 2010 executed by the computing computer 1001 (18005).

In case of which all the power rank zones to which priority is given are activated, priority is assigned to the power rank zones so that the value of the capacity of the unused memory page frames including the activated power rank zones is equal to or greater than the differential calculated by the processing of the step 11012.

After the processing of the step 18005 is executed, the routine proceeds to the processing of the step 18002.

Next, the remote process execution control program 2124 activates the power rank zones based on the value registered in the priority order set by the processing of the step 18004 or step 18005, or the power rank zone priority order 16020 in the received remote process execution message. The power rank zones are activated so that the value of the capacity of the unused memory page frames including the power rank zones for which a power mode was activated, is equal to or greater than the differential calculated by the processing of the step 11012 (18002). After the processing of the step 18002 is executed, the routine proceeds to the processing of the step 11015.

In case of which the value registered in the used power rank zone 16020 is not included in the received remote process execution message, the remote process execution control program 2124 activates the power rank zones with a priority based on the value registered in the memory allocation policy 16030 in the received remote process execution message.

In this way, in case of which the user computing program 2010 is executed as a remote process, the power mode of the minimum required memory rank 1031 can be changed to the active state. Also, fragmentation wherein the area used by the memory 1030 spans the memory rank 1031 can be suppressed.

Therefore, the power consumed by the memory 1030 can be substantially and effectively reduced. Further, since the power mode of the memory rank 1031 required for the computing computer 1001 to execute a remote process is activated first, the latency generated when changing over the power mode of the memory rank 1031 can be concealed. Therefore, the power consumed by the memory 1030 can be reduced without affecting the efficiency of access by the CPU 1010 to the memory 1030.

Moreover, when the user computing program 2010 is executed by the computing computer 1001, external disturbance can be eliminated.

In particular, in case of which the user computing program 2010 uses a large area of the memory 1030 (e.g., a scientific or technical calculation program), the power consumed by the memory 1030 can be more effectively reduced.

While the present invention has been described in detail and pictorially in the accompanying drawings, the present invention is not limited to such detail but covers various obvious modifications and equivalent arrangements, which fall within the purview of the appended claims.

What is claimed is:

1. A computer system comprising a control node and a computing node,
   wherein the control node comprises:
   a first processor which executes computational processing;
   a storage unit coupled to the first processor which stores a user program executed by the computing node; and
   a first interface coupled to another node, and
   sends a user program to the computing node,
   wherein the computing node comprises:
   a second processor which executes computational processing;
   a memory coupled to the second processor;
   a second interface coupled to the second processor and to the control node; and
   a memory controller coupled to the memory, and
   executes the user program which is sent from the control node,
   wherein a storage area of the memory is divided into memory ranks which are in units which the memory controller can control power independently,
   wherein a supplied power state of the memory is controlled, for each of the memory ranks, to one of an active state in which the storage area included in the memory rank can be accessed from the second processor, and an inactive state in which access from the second processor to the storage area is delayed, wherein the first processor sends a message including a memory capacity required to execute the user program, and wherein, in case of which the second processor receives the message sent from the first processor, the second processor puts the memory rank corresponding to the required memory capacity into the active state before the user program is loaded into the memory.

2. The computer system according to claim 1,
wherein the control node and the computing node are installed in a same enclosure, and
wherein the control node and the computing node are coupled by coupling the first interface and the second interface.

3. The computer system according to claim 1,
wherein the control node is installed in one enclosure, and the computing node is installed in the other enclosure, and
wherein the control node and the computing node are coupled by coupling the first interface and the second interface via a network.

4. The computer system according to claim 1,
wherein the storage unit stores information showing a capacity of the memory provided to the control node, and
wherein the first processor refers to the information showing the capacity of the memory, and determines the destination of the message.

5. The computer system according to claim 1, wherein the message includes:
an estimated value of the memory capacity estimated to be required for executing the user program;
an adjustment value for adjusting the estimated value;
information showing whether to put all memory ranks in the memory into the active state; and
information showing whether to execute the user program after the memory is put into the active state.

6. The computer system according to claim 1, wherein, in case of receiving the message including a command to put all of the memory ranks into the active state, the second processor puts all memory ranks into the active state by the memory controller before the user program is loaded into the memory.

7. The computer system according to claim 1, wherein the second processor prevents fragmentation in which the storage area allocated to the user program is allocated a plurality of memory ranks.

8. The computer system according to claim 1, wherein the second processor, after completing execution of the user program, puts the memory ranks which were put into the active state for use by the user program, into the inactive state by the memory controller.

9. The computer system according to claim 1,
wherein the storage unit stores an estimated value of the memory capacity estimated to be required to execute the user program, and an adjustment value for adjusting the estimated value,
wherein the first processor sends a message including the estimated value and the adjustment value, and
wherein the second processor, after completing execution of the user program, updates the adjustment value stored in the storage unit based on the difference between the value of the memory capacity put into the active state for actual use by the user program, and the estimated value included in the received message.

10. The computer system according to claim 1,
wherein the second processor manages the memory in power rank zone units, each of the power rank zones includes one or more of the memory ranks, and
wherein the storage unit stores the number of power rank zones in which memory rank that is put into the active state with priority is included, the priority order of power rank zones in which memory rank that is put into the active state with priority is included, and the policy of power rank zones in which memory rank that is put into the active state with priority is included.

11. The computer system according to claim 1,
wherein the second processor manages the memory in power rank zone units, each of the power rank zones includes one or more of the memory ranks,
wherein the first processor sends the message, to the second processor, further including at least one of the number of power rank zones in which memory rank that is put into the active state with priority is included, the priority order of power rank zones in which memory rank that is put into the active state with priority is included, and the policy of power rank zones in which memory rank that is put into the active state with priority is included, and
wherein the second processor, in case of receiving the message, puts the memory rank corresponding to the required memory capacity into the active state based on at least one of the number of the power ranks included in the received message, the priority order of the power rank zones, and the policy of the power rank zones before the user program is loaded into the memory.

12. A computing node, comprising:
a processor which executes computational processing;
a memory which is a storage area coupled to the processor; and
an interface coupled to a control node, and
the computing node executes a user program sent from the control node,
wherein the storage area of the memory is divided into memory ranks which are units in which the memory controller can control power independently,
wherein a supplied power state of the memory is controlled, for each of the memory ranks, to one of an active state in which the storage area included in the memory rank can be accessed from the processor and an inactive state in which access from the processor to the storage area is delayed, and
wherein the processor, in case of receiving a message including the memory capacity required for the user program to be executed, puts the memory rank corresponding to the required memory capacity into the active state before the user program is loaded into the memory.

13. The computing node according to claim 12, wherein the processor, in case of receiving the message including a command to put all of the memory ranks into the active state, puts all memory ranks into the active state by the memory controller before the user program is loaded into the memory.

14. The computing node according to claim 12, wherein the processor prevents fragmentation in which the storage area allocated to the user program is allocated a plurality of memory ranks.

15. The computing node according to claim 12, wherein the processor, after completing execution of the user program, puts the memory ranks which were put into the active state for use by the user program, into the inactive state.

16. The computing node according to claim 12,
wherein the storage unit stores an estimated value of memory capacity estimated to be required to execute the user program, and an adjustment value for adjusting the estimated value, and
wherein the processor, in case of receiving a message including the estimated value and the adjustment value, and in case of completing execution of the user program, updates the adjustment value stored in the storage unit based on the differential between the value of the memory capacity put into the active state for actual use by the user program, and the estimated value included in the received message.

17. The computing node according to claim 12,
wherein the processor manages the memory in power rank zone units, each of the power rank zones including one or more of the memory ranks,
wherein the message sent from the first processor further includes at least one of a number of power rank zones in which memory rank that is put into the active state with priority is included, a priority order of power rank zones in which memory rank that is put into the active state with priority is included, and a policy of power rank zones in which memory rank that is put into the active state with priority is included, and
wherein the processor, when receiving the message, puts the memory rank corresponding to the required memory capacity into the active state based on at least one of the number of the power ranks included in the received message, the priority order of the power rank zones, and the policy of the power rank zones prior to the user program being loaded into the memory.

18. A computer readable medium storing a program to be executed at a computing node which executes a user program sent by a control node,
wherein the computing node comprises:
a processor which executes computational processing;
a memory which is a storage area coupled to the processor;
an interface coupled to the control node; and
a memory controller coupled to the memory,
wherein the storage area of the memory is divided into memory ranks which are units in which the memory controller can control power independently, and
wherein the program includes a sequence of instructions that, when the program is executed, causes the computing node to:
control, for each of the memory ranks, the supplied power state of the memory to one of an active state in which the storage area included in the memory rank can be accessed from the processor and an inactive state in which access from the processor to the storage area is delayed,
in case of which the message including the memory capacity required to execute the user program is received, put the memory rank corresponding to the required memory capacity into the active state by the memory controller before the user program is loaded into the memory,
in case of which the message including an estimated value of the memory capacity estimated to be required to execute the user program and an adjustment value for adjusting the estimated value is received, and
in case of which execution of the user program is completed, update the adjustment value stored in the storage unit based on the differential between the value of the memory capacity put into the active state for actual use by the user program, and the estimated value included in the received message.

19. A computer readable medium storing a program to be executed at a computing node which executes a user program sent by a control node,
wherein the computing node comprises;
a processor which executes computational processing;
a memory which is a storage area coupled to the processor;
an interface coupled to the control node; and
a memory controller coupled to the memory,
wherein the storage area of the memory is divided into memory ranks which are units in which the memory controller can control power independently, and
wherein the program includes a sequence of instructions that, when the program is executed, causes the computing node to:
control, for each of the memory ranks, the supplied power state of the memory to one of an active state in which the storage area included in the memory rank can be accessed from the processor and an inactive state in which access from the processor to the storage area is delayed,
in case of which the message including the memory capacity required to execute the user program is received, put the memory rank corresponding to the required memory capacity into the active state by the memory controller before the user program is loaded into the memory,
wherein the message further includes at least one of a number of power rank zones in which memory rank that is put into the active state with priority is included, a priority order of power rank zones in which memory rank that is put into the active state with priority is included, and a policy of power rank zones in which memory rank that is put into the active state with priority is included, and
further including the sequence of instructions that, causes the computing node to: manage the memory in power rank zone units, each of the power rank zones including one or more of the memory ranks, and
in case of which the message is received, put the memory rank corresponding to the required memory capacity into the active state based on at least one of the number of the power ranks including in the received message, the priority order of the power rank zones and the policy of the power rank zones prior to the user program being loaded into the memory.

* * * * *